(12) United States Patent
Sugahara

(10) Patent No.: US 8,866,737 B2
(45) Date of Patent: Oct. 21, 2014

(54) INPUT DEVICE AND IMAGE DISPLAY APPARATUS

(75) Inventor: Hiroto Sugahara, Ama (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 332 days.

(21) Appl. No.: 13/363,344

(22) Filed: Jan. 31, 2012

(65) Prior Publication Data

US 2012/0249413 A1 Oct. 4, 2012

(30) Foreign Application Priority Data

Mar. 30, 2011 (JP) ................................. 2011-074328

(51) Int. Cl.
*G09G 5/00* (2006.01)

(52) U.S. Cl.
CPC ....................................... *G09G 5/00* (2013.01)
USPC .......................................................... 345/156

(58) Field of Classification Search
None
See application file for complete search history.

(56) References Cited

U.S. PATENT DOCUMENTS

| | | |
|---|---|---|
| 2003/0227441 A1 | 12/2003 | Hioki et al. |
| 2004/0008191 A1 | 1/2004 | Poupyrev et al. |
| 2005/0151782 A1 | 7/2005 | Ishida et al. |
| 2006/0274036 A1* | 12/2006 | Hioki et al. .................. 345/156 |
| 2009/0085866 A1 | 4/2009 | Sugahara |
| 2010/0247133 A1 | 9/2010 | Sugahara |
| 2011/0047460 A1* | 2/2011 | Choe .............................. 715/702 |
| 2011/0167391 A1* | 7/2011 | Momeyer et al. ............. 715/863 |
| 2011/0227822 A1* | 9/2011 | Shai ............................... 345/156 |

FOREIGN PATENT DOCUMENTS

| | | |
|---|---|---|
| JP | 2004-021528 A | 1/2004 |
| JP | 2004-046792 A | 2/2004 |
| JP | 2006-035662 A | 2/2006 |
| JP | 2009-086403 A | 4/2009 |
| JP | 2009-223875 A | 10/2009 |
| JP | 2010-117606 A | 5/2010 |
| JP | 2010-146506 A | 7/2010 |
| JP | 2010-224480 A | 10/2010 |
| JP | 2011-044128 A | 3/2011 |

OTHER PUBLICATIONS

Japan Patent Office, Notification of Reason for Refusal for Japanese Patent Application No. 2011-074328 (counterpart Japanese patent application), mailed Mar. 12, 2013.

* cited by examiner

*Primary Examiner* — Joseph Haley
*Assistant Examiner* — Emily Frank
(74) *Attorney, Agent, or Firm* — Merchant & Gould PC

(57) ABSTRACT

An input device including: an operation device including: a flexible base member; a first detector configured to detect that the base member is being bent; and a second detector configured to detect that the base member is being nipped; and an output section connected to the first detector and the second detector, the output section being configured to output a first signal when the first detector has detected that the base member is being bent and configured to output a second signal when the second detector has detected that the base member is being nipped.

18 Claims, 35 Drawing Sheets

FIG.17

| ITEM | USER'S OPERATION | | POTENTIAL OF FIRST ELECTRODE | | PROCESSING |
|---|---|---|---|---|---|
| | LINE | PROJECTING DIRECTION OF BASE MEMBER | BEND DETECTING PORTION 21 | BEND DETECTING PORTION 22 | |
| A | C1 | DOWNWARD | GND | + | IMAGE REDUCTION |
| B | C1 | UPWARD | GND | − | IMAGE ENLARGEMENT |
| C | C2 | DOWNWARD (AT LOW BENDING SPEED) | +(LOW) | GND | SWITCHING TO IMAGE BASED ON FIRST IMAGE DATA AFTER CURRENTLY-DISPLAYED IMAGE DATA |
| D | C2 | UPWARD (AT LOW BENDING SPEED) | −(LOW) | GND | SWITCHING TO IMAGE BASED ON FIRST IMAGE DATA BEFORE CURRENTLY-DISPLAYED IMAGE DATA |
| E | C2 | DOWNWARD (AT HIGH BENDING SPEED) | +(HIGH) | GND | SWITCHING TO IMAGE BASED ON FIFTH IMAGE DATA AFTER CURRENTLY-DISPLAYED IMAGE DATA |
| F | C2 | UPWARD (AT HIGH BENDING SPEED) | −(HIGH) | GND | SWITCHING TO IMAGE BASED ON FIFTH IMAGE DATA BEFORE CURRENTLY-DISPLAYED IMAGE DATA |

NOTE: THE LINE C1 IS A LINE PARALLEL TO A WIDTHWISE (SHORTER-SIDE) DIRECTION OF THE BASE MEMBER.
THE LINE C2 IS A LINE PARALLEL TO A LONGITUDINAL (LONGER-SIDE) DIRECTION OF THE BASE MEMBER.

INPUT DEVICE AND IMAGE DISPLAY APPARATUS

CROSS-REFERENCE TO RELATED APPLICATION

The present application claims priority from Japanese Patent Application No. 2011-074328, which was filed on Mar. 30, 2011, the disclosure of which is herein incorporated by reference in its entirety.

BACKGROUND OF THE INVENTION

1. Field of the Invention

The present invention relates to an input device and an image display apparatus.

2. Description of the Related Art

In general, an image display apparatus for displaying images such as a picture and a movie image includes an operation portion for a user to operate the image display apparatus, for example. The operation portion includes various buttons. When the user has operated one or more of the buttons, various signals are outputted from an output portion of the operation panel to a display portion for displaying the image thereon. That is, when the user has operated one or more of the buttons, the image display apparatus changes the image displayed on the display portion or enlarge/reduce a size of the image, for example.

SUMMARY OF THE INVENTION

In the selection from a plurality of functions such as the change of the image and the enlargement/reduction of the size of the image, the user needs to press different buttons for selecting various functions and to press various buttons in a predetermined order assigned to each function. Thus, it is difficult for a user who is not used to operating the buttons such as an old person to understand the functions of the plurality of buttons and press a small button(s) to select a desired function.

This invention has been developed to provide an input device and an image display apparatus allowing even a user who is not used to operating buttons to easily operate the buttons to perform a plurality of functions.

The present invention provides an input device, comprising: an operation device including: a flexible base member; a first detector configured to detect that the base member is being bent; and a second detector configured to detect that the base member is being nipped; and an output section connected to the first detector and the second detector, the output section being configured to output a first signal when the first detector has detected that the base member is being bent and configured to output a second signal when the second detector has detected that the base member is being nipped.

The present invention also provides an image display apparatus, comprising: a display portion configured to display an image thereon; an operation device including: a flexible base member; a first detector configured to detect that the base member is being bent; and a second detector configured to detect that the base member is being nipped; an output section connected to the first detector and the second detector, the output section being configured to output a first signal when the first detector has detected that the base member is being bent and configured to output a second signal when the second detector has detected that the base member is being nipped; and a controller connected to the output section and the display portion and configured to control the display of the image on the display portion, on the basis of the first signal and the second signal outputted by the output section.

BRIEF DESCRIPTION OF THE DRAWINGS

The objects, features, advantages, and technical and industrial significance of the present invention will be better understood by reading the following detailed description of the embodiment of the invention, when considered in connection with the accompanying drawings, in which:

FIG. 17 is a view showing image change processings assigned to types of bending deformation of the operation device;

DETAILED DESCRIPTION OF THE EMBODIMENT

Hereinafter, there will be described an embodiment of the present invention by reference to the drawings.

<Construction of Printer>

Figure 1:
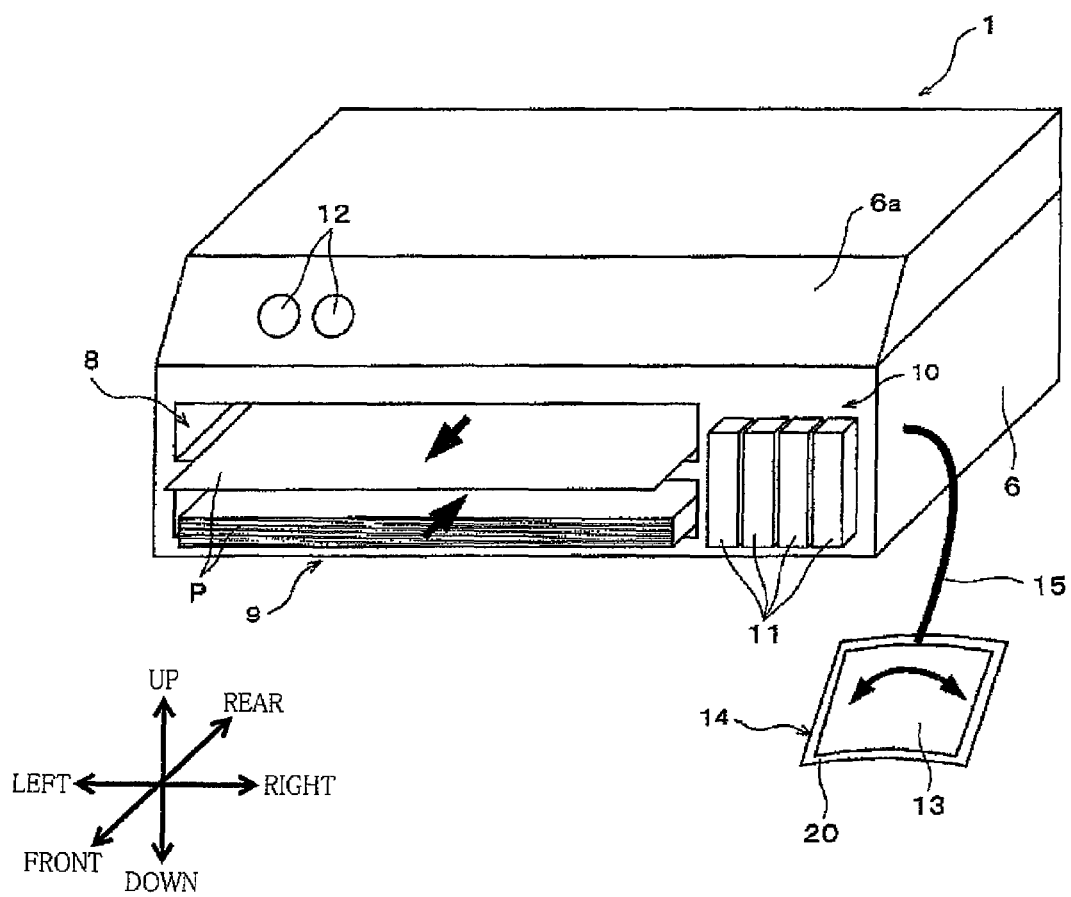
FIG. 1 is a perspective view generally showing a printer as one embodiment of the present invention.
Figure 2:
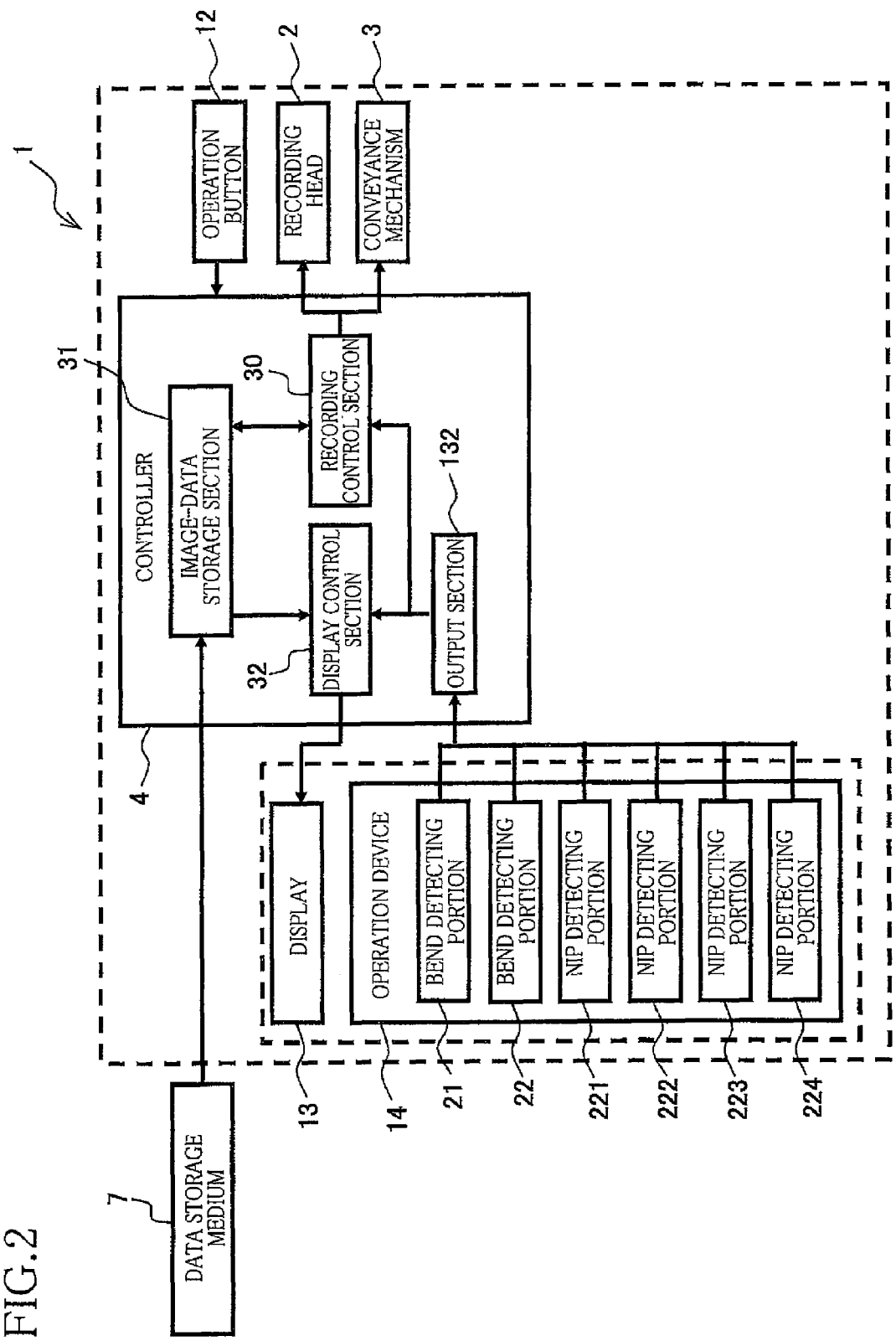
FIG. 2 is a view schematically showing an electric configuration of the printer.

As shown in FIGS. 1 and 2, a printer 1 (as one example of an image display apparatus) includes: a recording head 2 (as one example of a recording portion) configured to record an image on a recording sheet P (as one example of a recording medium); a conveyance mechanism 3 configured to convey the recording sheet P frontward in FIG. 1; and a controller 4 configured to control various components of the printer 1 including the recording head 2 and the conveyance mechanism 3.

The printer 1 includes a printer main body 6 having a rectangular parallelepiped shape. As shown in FIG. 2, the printer main body 6 accommodates various components such as the recording head 2, the conveyance mechanism 3, and the controller 4. As the recording head 2, there may be used well-known heads such as an ink jethead, a laser head, and a thermal transfer head. In a state in which a data storage medium 7 storing image data is connected to the printer 1, the recording head 2 records an image on the recording sheet P on the basis of image data (image file) inputted from the data storage medium 7 depending upon an instruction of the controller 4. It is noted that, in the following explanation, one image data means a sets of a plurality of data representative of one image.

A lower portion of the printer main body 6 partly opens frontward so as to provide an opening portion in which are provided (a) a sheet-supply tray 9 for accommodating recording sheets P and (b) a sheet-discharge tray 8 onto which the recording sheet P on which the image has been recorded is to be discharged. The conveyance mechanism 3 includes conveyance rollers that are rotated by one or a plurality of motors to convey an uppermost one of the recording sheets P in the sheet-supply tray 9 to the recording head 2 in the printer main body 6 and to discharge, onto the sheet-discharge tray 8, the recording sheet P on which the image has been recorded by the recording head 2.

A cartridge mount 10 is provided in a right portion (in FIG. 1) of a front face of the lower portion of the printer main body 6 on a side of the sheet-supply tray 9 and the sheet-discharge tray 8. Four ink cartridges 11 respectively storing inks of four colors, namely, yellow, magenta, cyan, and black are removably mounted on the cartridge mount 10.

An upper portion of the printer main body 6 inclines frontward toward a user positioned in front of the printer main body 6 in FIG. 1 so as to provide an inclined face 6a. A plurality of operation buttons 12 to be operated by the user are provided on the inclined face 6a.

Figure 3:
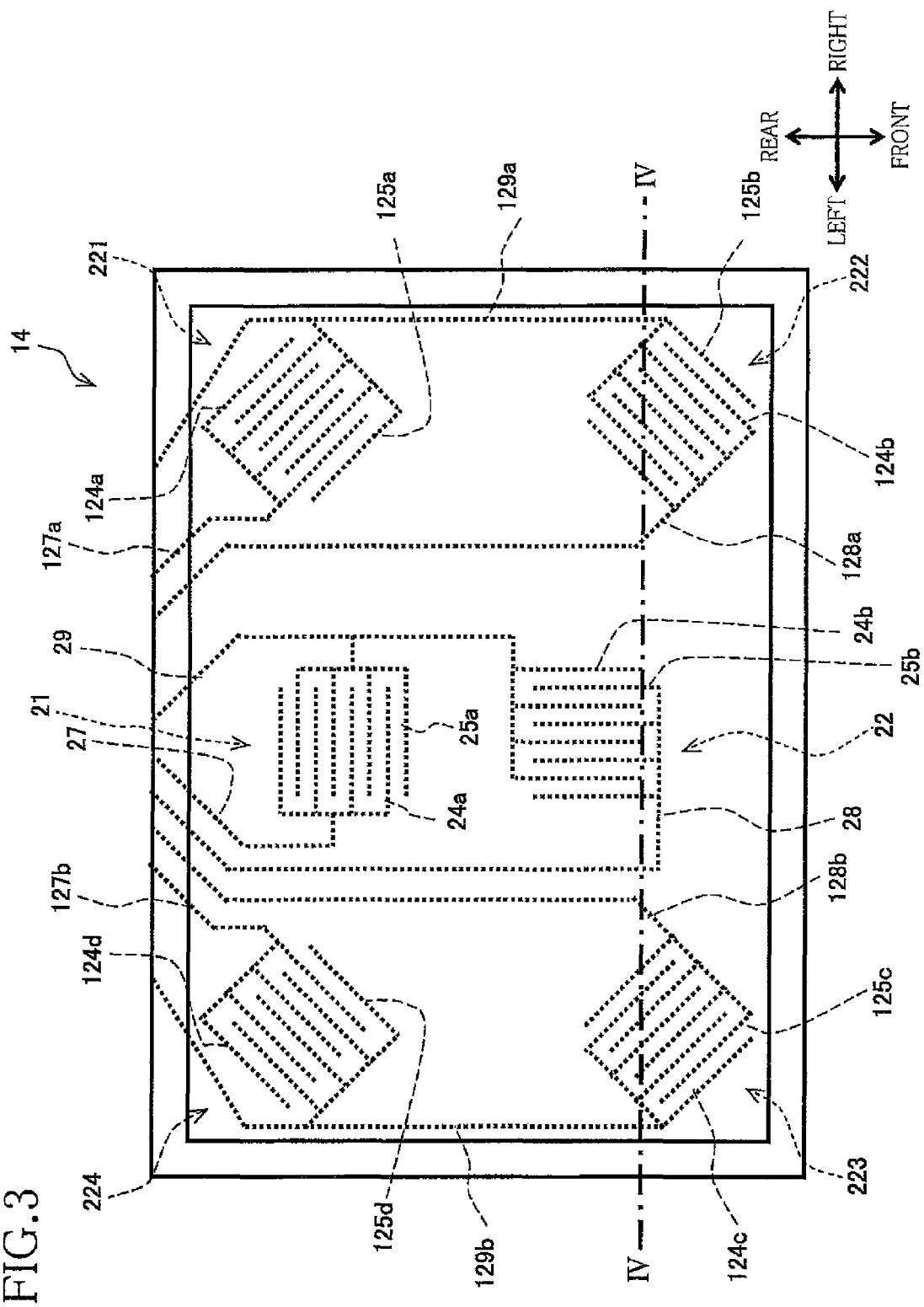
FIG. 3 is a plan view showing an operation device.
Figure 4:
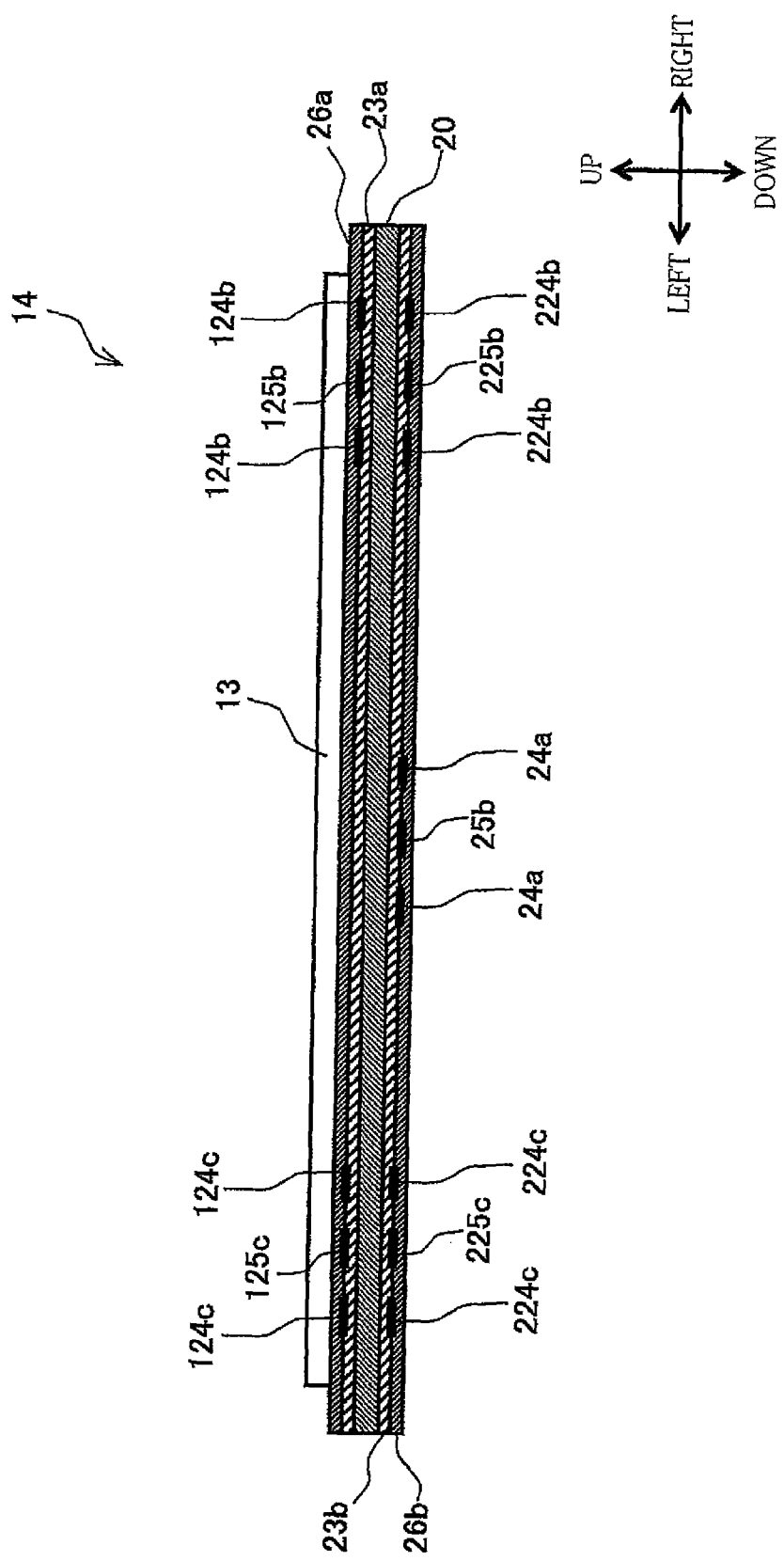
FIG. 4 is a cross-sectional view of the operation device taken along line IV-IV in FIG. 3.

The printer 1 includes an operation device 14 that includes: a flexible base member 20 having a sheet shape; and two bend detecting portions 21, 22 and four nip detecting portions 221, 222, 223, 224 arranged on a face of the base member 20. The bend detecting portions 21, 22 are for detecting a bend of the base member 20 (hereinafter may be called bending deformation). As shown in FIGS. 3 and 4, a display 13 (as one example of a display portion) having flexibility as a whole is provided on the face or an upper face of the base member 20 of the operation device 14. This display 13 is deformable with the base member 20. One example of the display 13 is an electronic paper having a thickness of several tenths of a millimeter (generally equal to that of a paper) and capable of displaying and erasing data by application of a voltage, for example. It is noted that, as shown in FIG. 1, the operation device 14 and the display 13 are connected with a cable 15 to the controller 4 (see FIG. 2) in the printer main body 6.

When the user wants to change the image(s) displayed on the display 13, the user bends or distorts the base member 20 of the operation device 14. The bending deformation of the base member 20 is detected by the two bend detecting portions 21, 22. The controller 4 changes the image displayed on the display 13 on the basis of a type of the bending deformation of the base member 20 detected by the bend detecting portions 21, 22.

When the user has nipped or gripped a lower left corner portion of the operation device 14, the controller 4 controls the display 13 to display a home screen thereon.

<Construction of Operation Device>

There will be next explained the operation device 14 in detail with reference to FIGS. 3 and 4. It is noted that the following explanation is given assuming that the operation device 14 is disposed such that an upward and downward direction in FIG. 3 coincides with a frontward and rearward direction in FIG. 1 and such that a rightward and leftward direction in FIG. 3 coincides with a rightward and leftward direction in FIG. 1. As shown in FIGS. 3 and 4, the operation device 14 includes: the base member 20 having a rectangular shape in plan view; piezoelectric layers 23a, 23b respectively provided on the front (upper) and a back face of the base member 20; and insulating layers 26a, 26b respectively provided on these piezoelectric layers 23a, 23b.

Two first electrodes 24a, 24b and two second electrodes 25a, 25b are arranged on a central portion of the piezoelectric layer 23b. Four first electrodes 124a, 124b, 124c, 124d and four second electrodes 125a, 125b, 125c, 125d are each arranged on a corresponding one of four corners (peripheral portion) on a face of the piezoelectric layer 23a. Likewise, third electrodes 224a, 224b, 224c, 224d and fourth electrodes 225a, 225b, 225c, 225d are each arranged on a corresponding one of four corners on a face of the piezoelectric layer 23b. It is noted that the third electrodes 224a, 224b, 224c, 224d and the fourth electrodes 225a, 225b, 225c, 225d are not illustrated in FIGS. 3 and 4.

The base member 20 is provided by a flexible sheet formed of a synthetic resin material such as polyimide or a flexible thin plate formed of a metal material such as aluminum alloy and stainless steel, for example.

Each of the piezoelectric layers 23a, 23b is formed of a piezoelectric material mainly composed of lead zirconate titanate (PZT) which is a solid solution of lead titanate and zirconate titanate and which has ferroelectricity. Each of the piezoelectric layers 23a, 23b is formed so as to cover an entirety of a corresponding one of the front or back face of the base member 20. This piezoelectric layer 23 is formed on the base member 20 by an aerosol deposition method, a sputtering method, or a sol-gel method, for example.

Each of the insulating layers 26a, 26b is formed of an insulative synthetic resin material such as polyimide, and the piezoelectric layers 23a, 23b are respectively covered with the insulating layers 26a, 26b.

Each of the first electrode 24a and the second electrode 25a has a comb-like shape. Specifically, each of the first electrode 24a and the second electrode 25a includes a main portion and projecting portions projecting from the main portion. The projecting portions of the first electrode 24a and the projecting portions of the second electrode 25a are alternately arranged. That is, the first electrode 24a and the second electrode 25a are offset symmetrical with each other. Likewise, each of a first electrode 24b and a second electrode 25b has the comb-like shape. Specifically, each of the first electrode 24b and the second electrode 25b includes a main portion and projecting portions projecting from the main portion. The projecting portions of the first electrode 24b and the projecting portions of the second electrode 25b are alternately arranged. That is, the first electrode 24b and the second electrode 25b are offset symmetrical with each other. The first electrode 24a and the second electrode 25a are arranged such that the projecting portions of the first electrode 24a and the projecting portions of the second electrode 25a are parallel to one another. The first electrode 24b and the second electrode 25b are arranged such that the projecting portions of the first electrode 24b and the projecting portions of the second electrode 25b are parallel to one another. Each of the first electrodes 24a, 24b and the second electrodes 25a, 25b is formed of a conductive material such as gold, copper, silver, palladium, platinum, and titanium by using screen printing or vapor deposition, for example.

The projecting portions of the first electrode 24a and the second electrode 25a extend in a longitudinal (longer-side) direction of the base member 20 (coinciding with a rightward and leftward direction in FIG. 3). The projecting portions of the first electrode 24b and the second electrode 25b extend in a widthwise (shorter-side) direction of the base member 20 (coinciding with an upward and downward direction in FIG. 3). That is, these electrodes are arranged such that the direction in which the projecting portions of the first electrode 24a and the second electrode 25a extend and the direction in which the projecting portions of the first electrode 24b and the second electrode 25b extend are perpendicular to each other.

As shown in FIG. 3, the first electrode 24a is connected to a wiring 27, and the first electrode 24b is connected to a wiring 28. The wirings 27, 28 are connected to the controller 4 (see FIG. 2). The second electrode 25a and the second electrode 25b are connected to a common wiring 29. This common wiring 29 is connected to a ground wiring provided on the controller 4. The second electrode 25a and the second electrode 25b are always kept at a ground potential (as one example of a constant electric potential) via the common wiring 29.

It is noted that, in a manufacturing stage, a relatively low electric potential (e.g., 0V (ground potential)) is applied to the first electrodes 24a, 24b, and a relatively high electric potential (e.g., 50V) is applied to the second electrodes 25a, 25b, whereby a portion of the piezoelectric layer 23b between the first electrode 24a and the second electrode 25a is polarized in a direction directed from the second electrode 25a toward the first electrode 24a, and a portion of the piezoelectric layer 23b between the first electrode 24b and the second electrode 25b is polarized in a direction directed from the second electrode 25b toward the first electrode 24b.

Each of the four first electrodes 124a, 124b, 124c, 124d and the four second electrodes 125a, 125b, 125c, 125d has the comb-like shape. Specifically, each of the first electrodes 124a, 124b, 124c, 124d and the second electrodes 125a, 125b, 125c, 125d includes a main portion and projecting portions projecting from the main portion. The first electrode 124a and the second electrode 125a are arranged such that the projecting portions of the first electrode 124a and the projecting portions of the second electrode 125a are alternately arranged so as to be parallel to one another. That is, the first electrode 124a and the second electrode 125a are offset symmetrical with each other. Each of the first electrodes 124b, 124c, 124d and the second electrodes 125b, 125c, 125d also has the comb-like shape and arranged in the same manner as that of the first electrode 124a and the second electrode 125a. Likewise, each of the four third electrodes 224a, 224b, 224c, 224d and the four fourth electrodes 225a, 225b, 225c, 225d has the comb-like shape and arranged in the same manner as that of the first electrode 124a and the second electrode 125a.

A direction in which the projecting portions of the first electrode 124a and the second electrode 125a located on an upper right corner portion of the base member 20 extend inclines 45 degrees in a clockwise direction with respect to the longitudinal direction of the base member 20 (coinciding with the direction in which the projecting portions of the first electrode 24a extend) and inclines 45 degrees in a counterclockwise direction with respect to the widthwise direction of the base member 20 (coinciding with the direction in which the projecting portions of the first electrode 24b extend). Likewise, a direction in which the projecting portions of the first electrode 124d and the second electrode 125d located on an upper left corner portion of the base member 20 extend inclines 45 degrees in the counterclockwise direction with respect to the longitudinal direction of the base member 20 (coinciding with the direction in which the projecting portions of the first electrode 24a extend) and inclines 45 degrees in the clockwise direction with respect to the widthwise direction of the base member 20 (coinciding with the direction in which the projecting portions of the first electrode 24b extend). The first electrodes 124b, 124c and the second electrodes 125b, 125c have the same configuration as described above, and an explanation of which is dispensed with. Further, the third electrodes 224a, 224b, 224c, 224d and the fourth electrodes 225a, 225b, 225c, 225d are configured in the same manner as that in the first electrodes 124a, 124b, 124c, 124d and the second electrodes 125a, 125b, 125c, 125d.

It is noted that each of the first electrodes 124a, 124b, 124c, 124d, the second electrodes 125a, 125b, 125c, 125d, the third electrodes 224a, 224b, 224c, 224d, and the fourth electrodes 225a, 225b, 225c, 225d is formed of a conductive material such as gold, copper, silver, palladium, platinum, and titanium by using the screen printing or the vapor deposition, for example.

As shown in FIG. 3, the first electrode 124a is connected to a wiring 127a, and the first electrode 124b is connected to a wiring 128a. The first electrode 124c is connected to a wiring 127b, and the first electrode 124d is connected to a wiring 128b. The wirings 127a, 127b, 128a, 128b are connected to the controller 4 (see FIG. 2). The second electrode 125a and the second electrode 125b are connected to a common wiring 129a. The second electrode 125c and the second electrode 125*d* are connected to a common wiring 129*b*. Like the common wiring 29, the common wiring 129*a* and the common wiring 129*b* are connected to the ground wiring provided on the controller 4. The second electrodes 125*a*, 125*b*, 125*c*, 125*d* are always kept at the ground potential via the common wiring 129*a*, 129*b*.

It is noted that, in the manufacturing stage, the relatively low electric potential (e.g., 0V (ground potential)) is applied to the first electrodes 124*a*, 124*b*, 124*c*, 124*d*, and the relatively high electric potential (e.g., 50V) is applied to the second electrodes 125*a*, 125*b*, 125*c*, 125*d*, whereby a portion of the piezoelectric layer 23*a* between the first electrode 124*a* and the second electrode 125*a* is polarized in a direction directed from the second electrode 125*a* toward the first electrode 124*a*, and a portion of the piezoelectric layer 23*a* between the first electrode 124*b* and the second electrode 125*b* is polarized in a direction directed from the second electrode 125*b* toward the first electrode 124*b*. Further, a portion of the piezoelectric layer 23*a* between the first electrode 124*c* and the second electrode 125*c* is polarized in a direction directed from the second electrode 125*c* toward the first electrode 124*c*, and a portion of the piezoelectric layer 23*a* between the first electrode 124*d* and the second electrode 125*d* is polarized in a direction directed from the second electrode 125*d* toward the first electrode 124*d*. It is noted that the third electrodes 224*a*, 224*b*, 224*c*, 224*d* and the fourth electrodes 225*a*, 225*b*, 225*c*, 225*d* arranged on the piezoelectric layer 23*b* are polarized in the same manner.

It is noted that each of the first electrodes 24*a*, 24*b*, the second electrodes 25*a*, 25*b*, and the bend detecting portions 21, 22 is one example of a first detector. Each of the first electrodes 124*a*-124*d*, the third electrodes 224*a*-224*d*, the second electrodes 125*a*-125*d*, the fourth electrodes 225*a*-225*d*, and the nip detecting portions 221-224 is one example of a second detector. Further, each of portions of the base member 20 on which the first electrodes 24*a*, 24*b* and the second electrodes 25*a*, 25*b* are located is one example of a deformation portion, and each of portions of the base member 20 on which the first electrodes 124*a*-124*d* and the second electrodes 125*a*-125*d* are located is one example of a contact portion. It is noted that each of the nip detecting portions 221-224 is for detecting that the base member 20 is nipped or pinched by the user, when the user has nipped the base member 20 from its front and back sides, and thereby the base member 20 is elongated or expanded in a direction parallel to the face of the base member 20.

There will be next explained actions when the bend detecting portion 21 and/or the bend detecting portion 22 has detected the bending deformation of the base member 20, with reference to FIGS. 5-16.

When the bending deformation has occurred on the area of the base member 20 on which the bend detecting portions 21, 22 are provided, and thereby the portion of the piezoelectric layer 23*b* between the first electrode 24*a* and the second electrode 25*a* has been strained or deformed (distorted), an electric field (i.e., a potential difference) is generated between the first electrode 24*a* and the second electrode 25*a* depending upon the strain. This action will be explained in detail for each type of the bending deformation of the base member 20.

<First Type>

As shown in FIGS. 5-10, when the base member 20 has been bent about the line C1 parallel to its widthwise direction, the piezoelectric layer 23*a* and the base member 20 are deformed so as to project frontward (upward) or backward (downward). In this deformation, the portion of the piezoelectric layer 23*b* between the first electrode 24*b* and the second electrode 25*b* in the bend detecting portion 22 is elongated or contracted in a direction perpendicular to the direction of the extension of the projecting portions of the electrodes (i.e., in the longitudinal direction of the base member 20).

Figure 6:
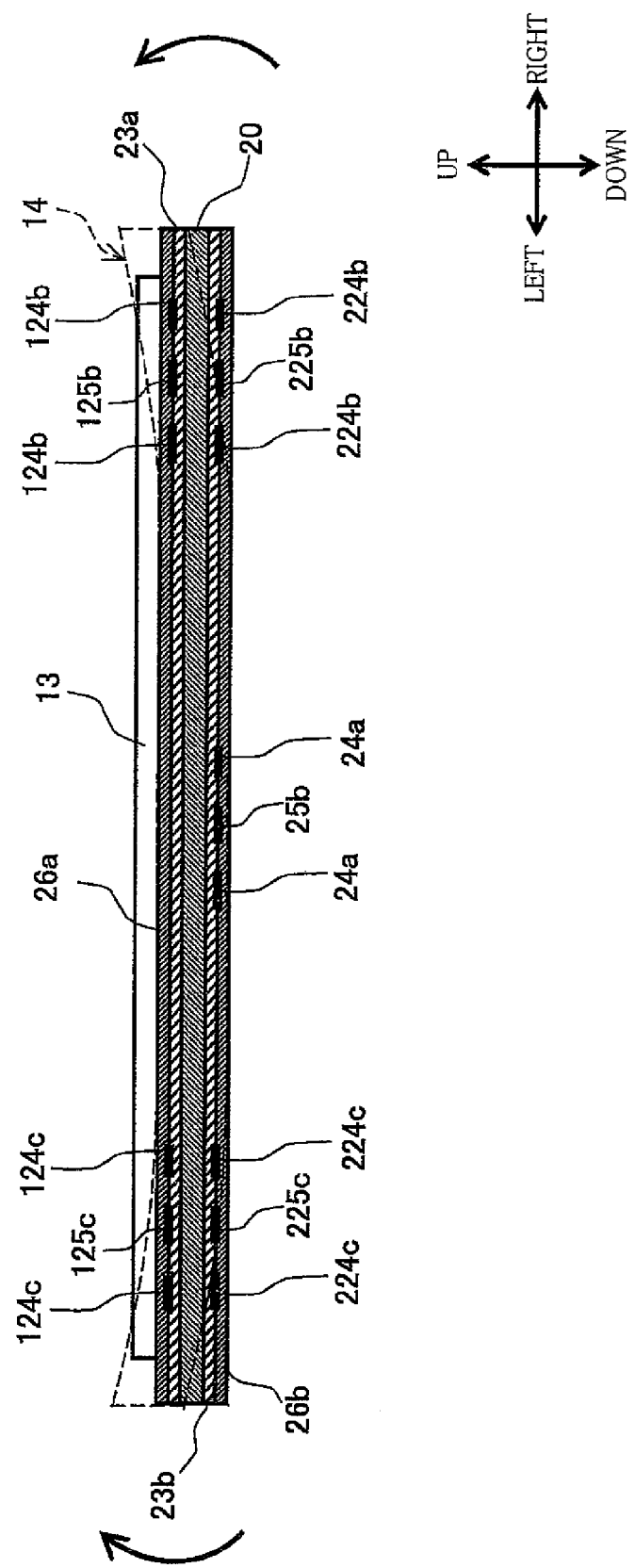
FIG. 6 is a cross-sectional view of the operation device taken along line VI-VI in FIG. 5.

That is, as indicated by broken lines in FIG. 6, when the base member 20 and the piezoelectric layer 23*b* have been bent about the line C1 so as to project downward, the face of the piezoelectric layer 23*b* is elongated in a direction parallel to its polarization direction. At this time, an electric field in a direction opposite to the polarization direction (i.e., an electric field in a direction directed from the first electrode 24*b* toward the second electrode 25*b*) is generated in the piezoelectric layer 23*b*. As a result, a positive electric potential higher than the electric potential of the second electrode 25*b* (the ground potential) occurs in the first electrode 24*b*.

Figure 9:
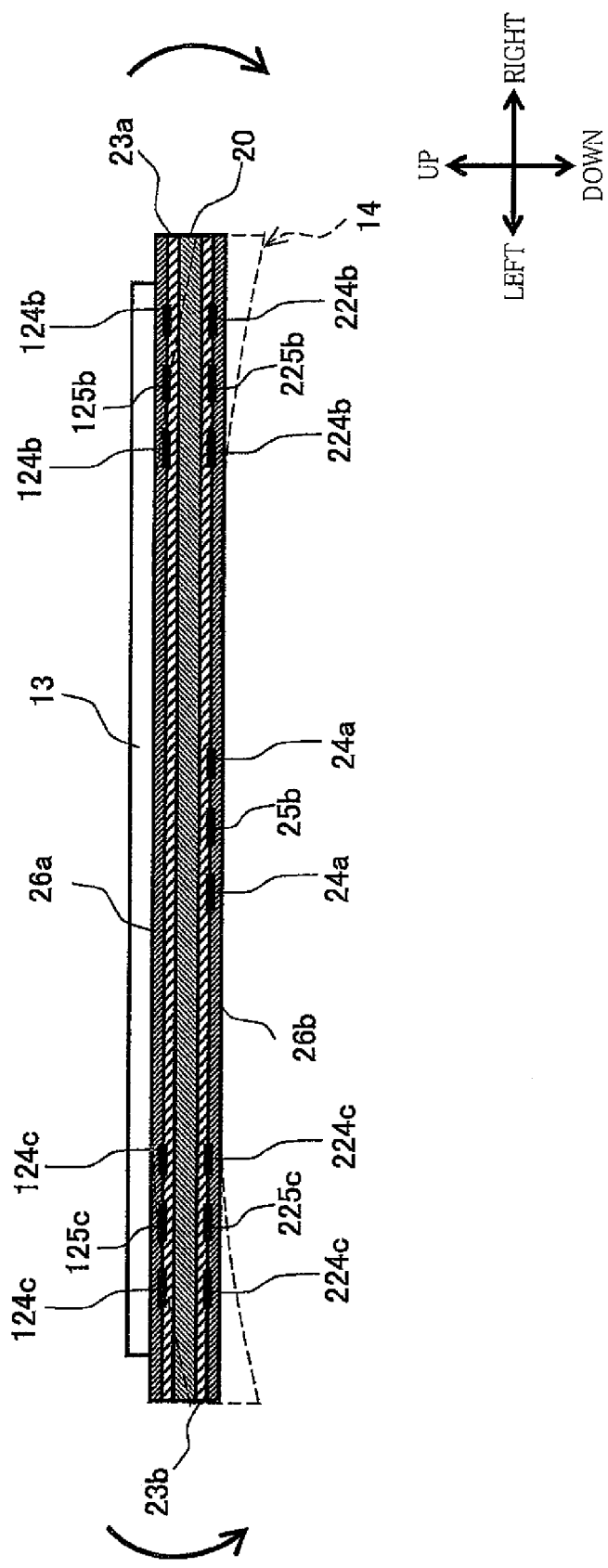
FIG. 9 is a cross-sectional view of the operation device taken along line IX-IX in FIG. 8.

Further, as indicated by broken lines in FIG. 9, when the base member 20 and the piezoelectric layer 23*b* have been bent about the line C1 so as to project upward, the face of the piezoelectric layer 23*b* is contracted in the direction parallel to its polarization direction in the bend detecting portion 22 provided on the back face of the base member 20. At this time, the electric field in the polarization direction (i.e., the electric field in the direction directed from the second electrode 25*b* toward the first electrode 24*b*) is generated in the piezoelectric layer 23*b*. As a result, a negative electric potential lower than the electric potential of the second electrode 25*b* (the ground potential) occurs in the first electrode 24*b*.

It is noted that, at this time, the portion of the piezoelectric layer 23*b* between the first electrode 24*a* and the second electrode 25*a* is deformed (elongated or contracted) also in the bend detecting portion (the other bend detecting portion) 21. However, the direction of the deformation is parallel to the direction of the extension of the projecting portions of the electrodes (i.e., the longitudinal direction of the base member 20) and is different from (perpendicular to) the polarization direction of the piezoelectric layer 23*b* in the bend detecting portion 21. Thus, few potential differences are generated between the first electrode 24*a* and the second electrode 25*a* in the bend detecting portion 21.

<Second Type>

As shown in FIGS. 11-16, when the base member 20 has been bent about the line C2 parallel to its longitudinal direction, the above-explained first type of the bending deformation of the bend detecting portion 22 occurs on the bend detecting portion 21. That is, the portion of the piezoelectric layer 23*b* between the first electrode 24*a* and the second electrode 25*a* is elongated or contracted in the bend detecting portion 21 in a direction perpendicular to the direction of the extension of the projecting portions of the electrodes (i.e., in the widthwise direction of the base member 20).

Figure 13:
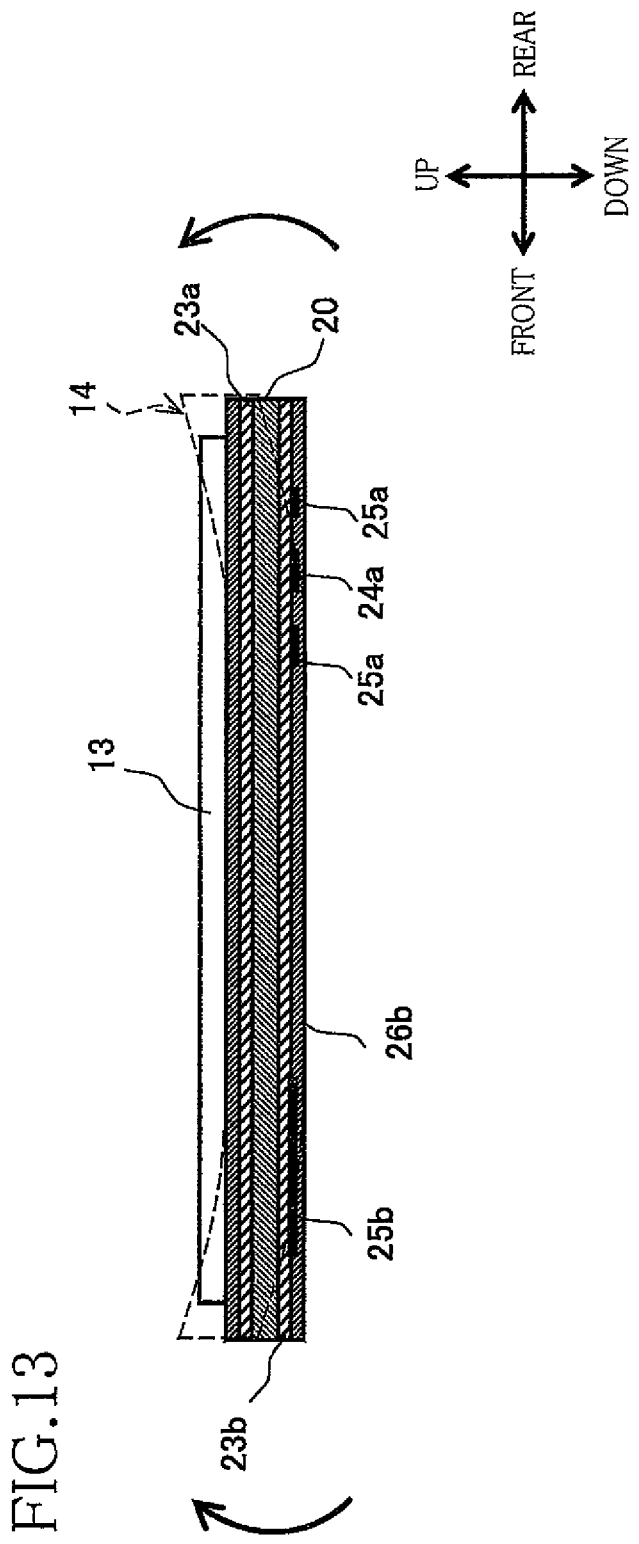
FIG. 13 is a cross-sectional view of the operation device taken along line XIII-XIII in FIG. 11.

That is, as indicated by broken lines in FIG. 13, when the base member 20 and the piezoelectric layer 23*b* have been bent about the line C2 so as to project downward, the face of the piezoelectric layer 23*b* is elongated in the direction parallel to its polarization direction in the bend detecting portion 21 provided on the back face of the base member 20. At this time, an electric field in a direction opposite to the polarization direction (i.e., an electric field in a direction directed from the first electrode 24*a* toward the second electrode 25*a*) is generated in the piezoelectric layer 23*b*. As a result, the positive electric potential higher than the electric potential of the second electrode 25*a* (the ground potential) occurs in the first electrode 24*a*.

Figure 16:
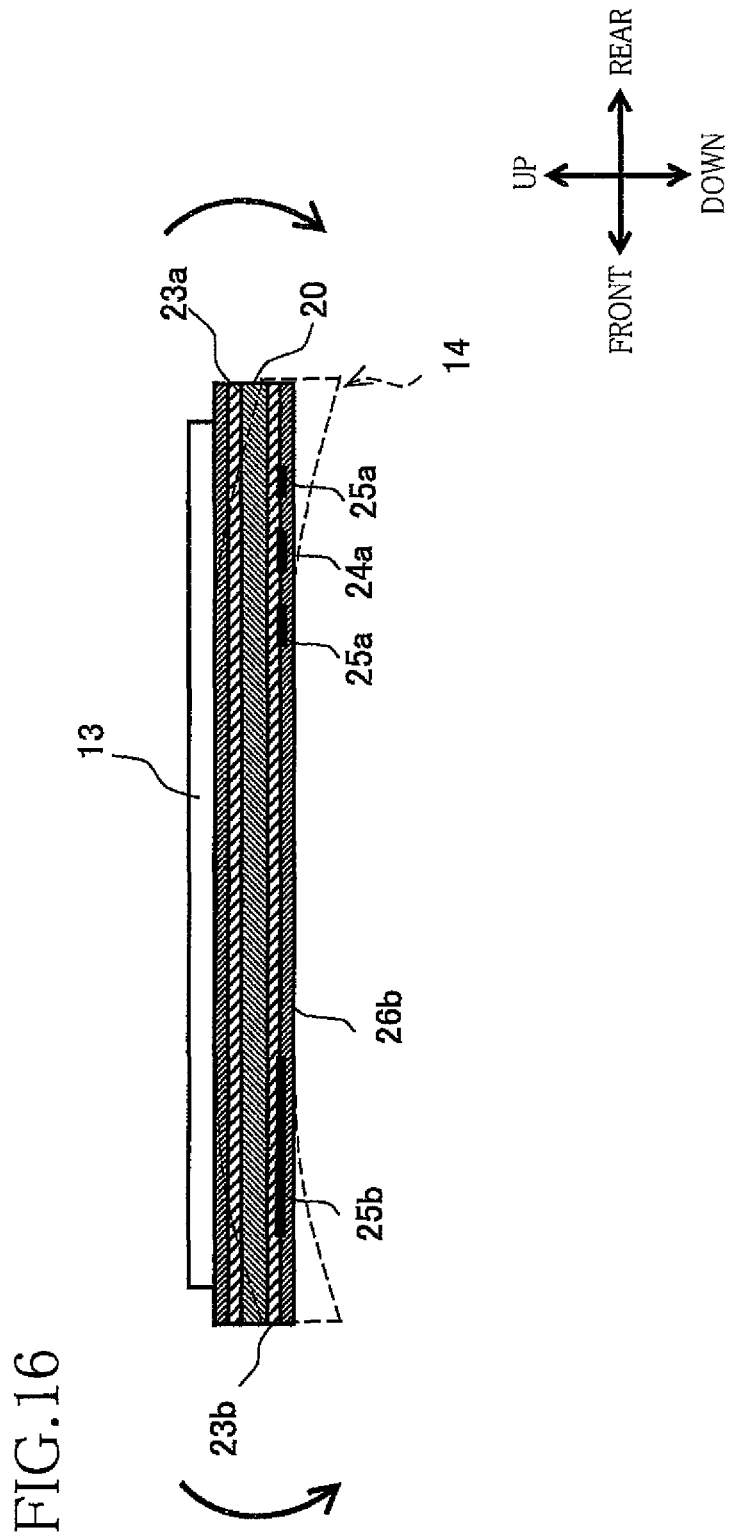
FIG. 16 is a cross-sectional view of the operation device taken along line XVI-XVI in FIG. 14.

Further, as indicated by broken lines in FIG. 16, when the base member 20 and the piezoelectric layer 23*b* have been bent about the line C2 so as to project upward, the face of the piezoelectric layer 23*b* is contracted in the direction parallel to its polarization direction in the bend detecting portion 22 provided on the back face of the base member 20. At this time, the electric field in the polarization direction (i.e., the electric field in the direction directed from the second electrode 25a toward the first electrode 24a) is generated in the piezoelectric layer 23b. As a result, the negative electric potential lower than the electric potential of the second electrode 25a occurs in the first electrode 24a.

At this time, the portion of the piezoelectric layer 23b between the first electrode 24b and the second electrode 25b connected to the bend detecting portion 22 is deformed (elongated or contracted). However, the direction of the deformation is parallel to the direction of the extension of the projecting portions of the electrodes (i.e., the widthwise direction of the base member 20) and is different from (perpendicular to) the polarization direction of the piezoelectric layer 23b. Thus, few potential differences are generated between the first electrode 24b and the second electrode 25b connected to the bend detecting portion 22.

As thus described, the direction in which the projecting portions of the first electrode 24a and the second electrode 25a extend and the direction in which the projecting portions of the first electrode 24b and the second electrode 25b extend are different from each other. Thus, the two bend detecting portions 21, 22 can detect the bending deformation of the base member 20 such that the bending deformations of the base member 20 about the respective lines C1, C2 perpendicular to each other are distinguished from each other.

<Third Type>

In the bending deformation of the above-described first and second types, where the base member 20 has been bent with a relatively strong force (that is, a speed of the bending of the base member 20 (bending speed) is relatively high), a magnitude of the electric field generated in the piezoelectric layer 23b may be large. That is, where the second electrodes 25a, 25b are always kept at a constant electric potential (at ground potential), the higher the bending speed of the base member 20, the larger an absolute value of the electric potential of the first electrode 24a or the first electrode 24b becomes. Accordingly, it is possible for the two bend detecting portions 21, 22 to detect the bending deformation of the base member 20 while distinguishing the bending speeds of the bending deformations of the base member 20 based on the absolute value of the electric potentials of the first electrodes 24a, 24b.

In view of the above, the controller 4 can distinguish and recognize the plurality of types of the bending deformation of the base member 20 on the basis of voltage signals outputted from the bend detecting portion 21 and the bend detecting portion 22 (on the basis of the electric potential of the first electrode 24).

In this printer 1, when the user has bent the base member 20 of the operation device 14 in one of predetermined types of deformation like bending a paper, the two bend detecting portions 21, 22 detect the bending deformation of the base member 20, based on which the image displayed on the display 13 is changed. This image change processing will be explained in detail in an explanation of the controller 4 below.

There will be next explained that the four nip detecting portions 221-224 detect the nip of the base member 20. When the user has nipped, with his or her fingers, a portion of the base member 20 at which the first electrode 124a, the second electrode 125a, the third electrode 224a, and the fourth electrode 225b are located, a portion of the piezoelectric layer 23a which corresponds to the portion contacted by the user's fingers is contracted in a thickness direction of the piezoelectric layer 23a and thereby elongated in the direction parallel to the polarization direction. Likewise, a portion of the piezoelectric layer 23b which corresponds to the portion contacted by the user's fingers is also elongated in the direction parallel to the polarization direction. Thus, an electric field in a direction opposite to the polarization direction (i.e., an electric field in a direction directed from the first electrode 124a toward the second electrode 125a) is generated in the piezoelectric layer 23a. As a result, a positive electric potential higher than the electric potential of the second electrode 125a (the ground potential) occurs in the first electrode 124a. Likewise, an electric field in a direction opposite to the polarization direction (i.e., an electric field in a direction directed from the third electrode 224a toward the fourth electrode 225a) is generated in the piezoelectric layer 23b. As a result, a positive electric potential higher than the electric potential of the fourth electrode 225a occurs in the third electrode 224a.

At this time, since the user locally nips only the portion of the base member 20 at which the first electrode 124a and the second electrode 125a are located, portions of the piezoelectric layer 23a on which the first electrodes 124b, 124c, 124d and the second electrodes 125b, 125c, 125d are disposed are not deformed. Thus, positive electric potentials higher than those of the second electrodes 125b, 125c, 125d do not occur in the first electrodes 124b, 124c, 124d. Further, since the user locally nips only the portion of the base member 20 at which the third electrode 224a and the fourth electrode 225a are located, portions of the piezoelectric layer 23b on which the third electrode 224b, 224c, 224d and the fourth electrode 225b, 225c, 225d are disposed are not deformed. Thus, positive electric potentials higher than those of the fourth electrodes 225b, 225c, 225d do not occur in the third electrodes 224b, 224c, 224d.

In view of the above, the controller 4 can identify and recognize the nip detecting portion(s) having detected the nip among the four nip detecting portions 221-224 on the basis of a voltage signal(s) outputted from one or more of the four nip detecting portions 221-224 (on the basis of the electric potentials of the first electrodes 124a-124d).

There will be next explained an electric configuration of the printer 1 (the controller 4) with reference to FIG. 2. The controller 4 includes: a central processing unit (CPU); a read only memory (ROM) storing programs and data for controlling the components of the printer 1; a random access memory (RAM) temporarily storing data to be processed by the CPU; and an input/output interface, not shown, for input and output with an external device.

As shown in FIG. 2, the controller 4 includes: a recording control section 30; an image-data storage section 31 for storing the image data inputted from the data storage medium 7; a display control section 32 for controlling the display 13; and an output section 132 connected to the recording control section 30 and the display control section 32 and also to the operation device 14. The data storage medium 7 has image folders storing a plurality of image data ordered and arranged in advance based on a predetermined condition such as a name of a data file (written in the alphabet, for example) and a date and time of creation of the image data. The plurality of the image data read out from the data storage medium 7 is stored into the image-data storage section 31 with the data storage medium 7 connected to the printer 1.

It is noted that examples of the data storage medium 7 storing the image data include: storage devices each mountable on, e.g., a slot of the printer and connected thereto such as a USB memory and a memory card; and external storage devices connected to the controller 4 by wired communication using a cable or wireless communication. The data stored in the data storage medium 7 may be static image data obtained using a digital camera or movie data obtained using a digital video camera. Here, the movie data is time series of a plurality of sequential static (still) image data. When the movie data has been inputted from the data storage medium 7, the controller 4 extracts a plurality of static image data from the inputted movie data and displays an image on the basis of part of the plurality of the static image data or controls the recording head 2 to record a static image on the recording sheet P on the basis of part of the plurality of the static image data.

The recording control section 30 controls the recording head 2 and the conveyance mechanism 3 on the basis of the data stored in the image-data storage section 31 to execute a processing for recording an image on the recording sheet P on the basis of image data selected by the user. Further, the display control section 32 displays a state of the printer 1 (such as a state during the image recording and a standby state), an error message, and the like on the display 13 to notify the user of information thereabout.

The output section 132 is connected to the two bend detecting portions 21, 22 and the four nip detecting portions 221-224 to output signals to the recording control section 30 and the display control section 32 on the basis of the voltage signal(s) outputted therefrom. For example, when the bend detecting portion 21 has detected that the base member 20 is being bent, the output section 132 outputs a bend detection signal (as one example of a first signal) to the recording control section 30 and the display control section 32 on the basis of the voltage signal(s) outputted from the bend detecting portion 21. When the nip detecting portion 221 has detected that the base member 20 is being nipped or gripped, the output section 132 outputs a nip detection signal (as one example of a second signal) to the recording control section 30 and the display control section 32 on the basis of the voltage signal outputted from the nip detecting portion 221.

It is noted that the output section 132 outputs a bend detection signal having a positive electric potential on the basis of positive electric potential signals outputted from the bend detecting portions 21, 22 and outputs a bend detection signal having a negative electric potential on the basis of negative electric potential signals outputted from the bend detecting portions 21, 22. Further, the recording control section 30 has a function for perform the recording on the recording sheet P when the nip detection signal has been inputted from the output section 132. For example, when the nip detection signal has been inputted, the recording control section 30 controls the recording head 2 and the conveyance mechanism 3 to perform the recording on the recording sheet P or cancel the recording in midstream (halfway through the recording).

When the bend detection signal has been inputted from the output section 132 or when the nip detection signal has been inputted from the output section 132, the display control section 32 can change the image displayed on the display 13. For example, when the bend detection signal has been inputted, the display control section 32 executes an image processing for enlarging or reducing a size of an image being displayed or a processing for replacing an image based on the image data with an image based on another image data. When the nip detection signal has been inputted, the display control section 32 executes a processing for displaying the home screen on which a list of function menus are displayed or a processing for displaying detailed information such as the file size and the created date and time of the image. Further, when the voltage signal has been inputted from one of the four nip detecting portions 221-224, the output section 132 identifies the nip detecting portion having outputted the voltage signal to output the nip detection signal to the recording control section 30 or the display control section 32 on the basis of the function assigned to the identified nip detecting portion.

It is noted that each of the recording control section 30, the image-data storage section 31, and the display control section 32 is realized by the components of the controller 4 such as the CPU, the ROM, and the RAM. In other words, the ROM of the controller 4 stores therein various programs such as control programs for the recording head 2 and the conveyance mechanism 3 and a program for changing the image displayed on the display 13, and these programs are executed by the CPU of the controller 4, whereby the functions of the recording control section 30, the image-data storage section 31, and the display control section 32 are performed.

It is noted that each of the operation device 14 and the output section 132 in the present embodiment is one example of an input device.

<Image Change Processing>

There will be next explained the image change processings executed by the display control section 32 when the base member 20 of the operation device 14 has been bent by the user or when the base member 20 of the operation device 14 has been nipped by the user.

As described above, this printer 1 having the two bend detecting portions 21, 22 provided on the base member 20 can distinguish and detect the plurality of types of the bending deformation of the base member 20 when the base member 20 has been bent by the user. As shown in FIG. 17, six image change processings for enlarging/reducing and changing the image are assigned in advance respectively to six types of the bending deformation (items A-F) distinguishably detected by the two bend detecting portions 21, 22.

(i) Enlargement and Reduction of Image

Figure 5:
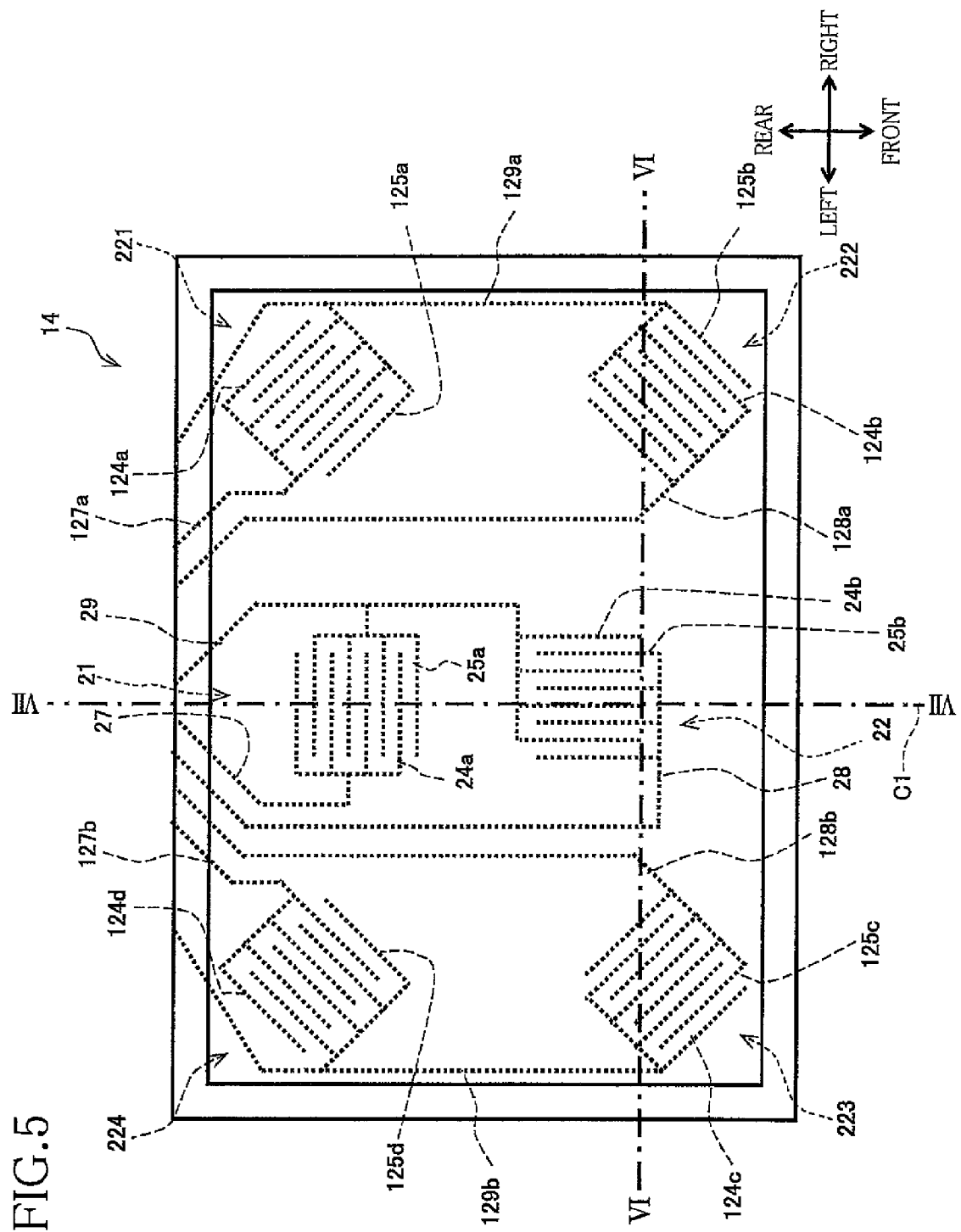
FIG. 5 is a plan view showing a state of the operation device when the operation device is bent about a line C1 so as to project toward a back side of a sheet of FIG. 5.
Figure 7:
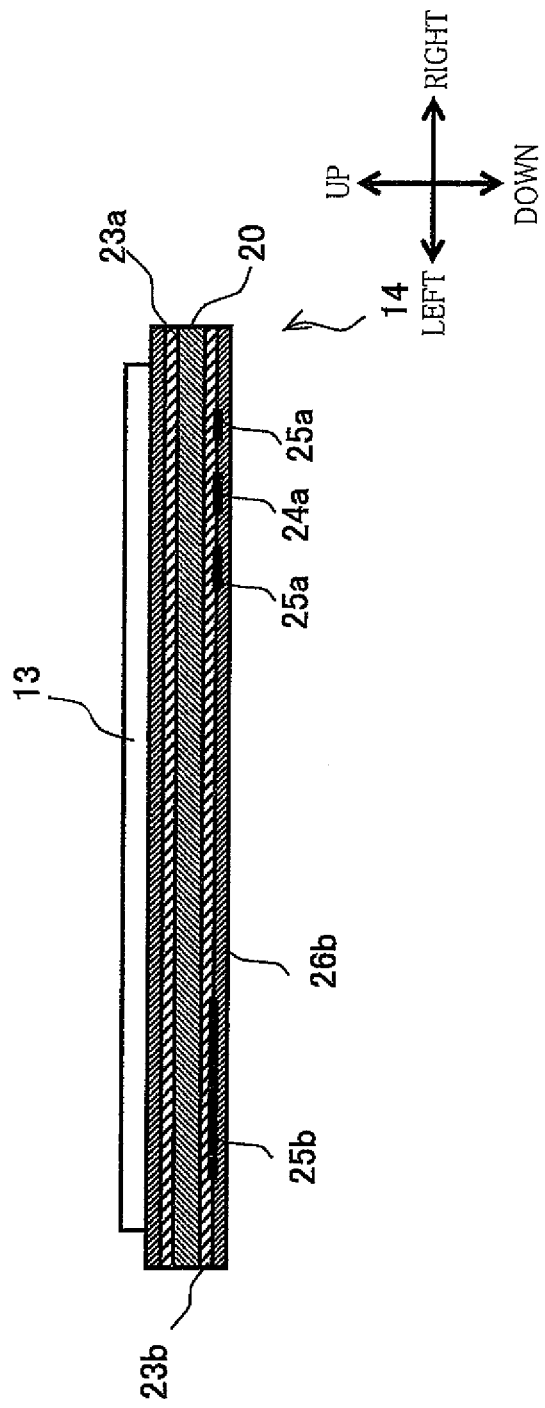
FIG. 7 is a cross-sectional view of the operation device taken along line VII-VII in FIG. 5.

As shown in FIGS. 5-7, when the base member 20 having the rectangular sheet-like shape has been bent by the user about the line C1 parallel to its widthwise direction so as to project downward (backward when viewed from the user) as indicated by the item A in FIG. 17, the face of the piezoelectric layer 23b is elongated in the longitudinal direction of the base member 20. In response, the electric field in the direction opposite to the polarization direction (in the direction directed from the first electrode 24b toward the second electrode 25b) is generated on the portion of the piezoelectric layer 23b between the first electrode 24b and the second electrode 25b, whereby a positive electric potential occurs in the first electrode 24b. When having received this voltage signal, the output section 132 outputs the bend detection signal having the positive electric potential to the display control section 32. When having received this signal, the display control section 32 judges that the base member 20 has been bent about the line C1 so as to project downward, and then the display control section 32 controls the display 13 to display thereon a reduced-size image obtained by reducing a size of the image being displayed.

Figure 8:
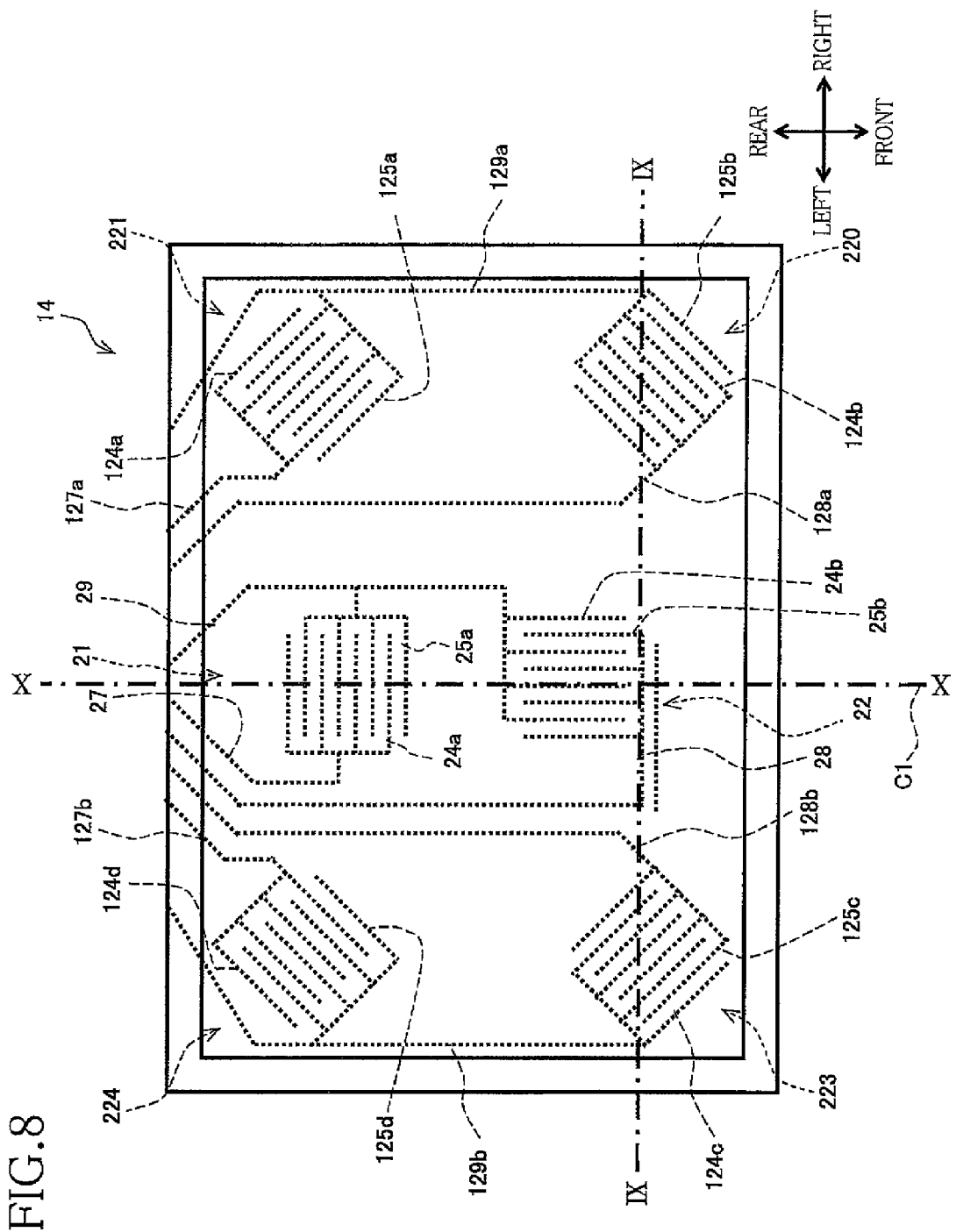
FIG. 8 is a plan view showing a state of the operation device when the operation device is bent about the line C1 so as to project toward a front side of a sheet of FIG. 8.
Figure 10:
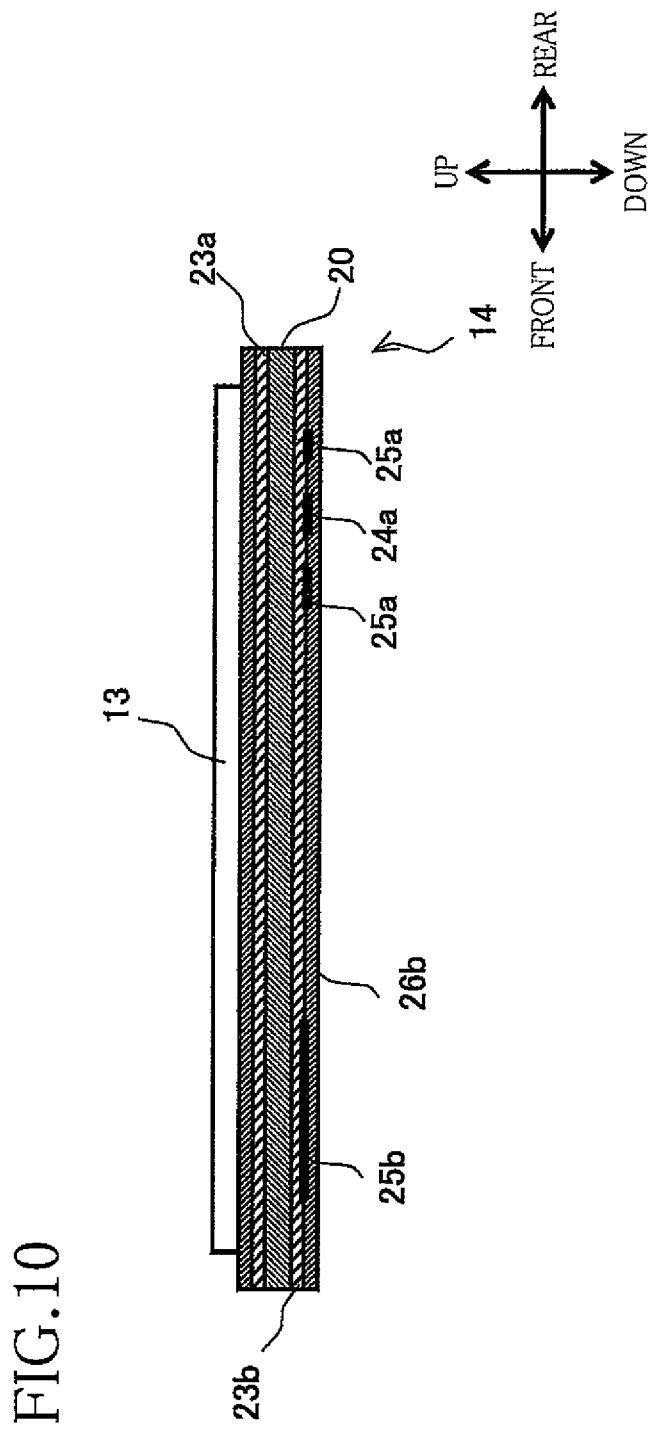
FIG. 10 is a cross-sectional view of the operation device taken along line X-X in FIG. 8.

Further, as shown in FIGS. 8-10, when the base member 20 has been bent about the line C1 parallel to its widthwise direction so as to project upward (frontward when viewed from the user) as indicated by the item B in FIG. 17, the face of the piezoelectric layer 23b is contracted in the longitudinal direction of the base member 20. In response, the electric field in the polarization direction (in the direction directed from the second electrode 25b toward the first electrode 24b) is generated on the portion of the piezoelectric layer 23b between the first electrode 24b and the second electrode 25b, whereby a negative electric potential occurs in the first electrode 24b. When having received this voltage signal, the output section 132 outputs the bend detection signal having the negative electric potential to the display control section 32. When having received this signal, the display control section 32 judges that the base member 20 has been bent about the line C1 so as to project upward, and then the display control section 32 controls the display 13 to display thereon an enlarged image obtained by enlarging a central portion of the image being displayed.

That is, when the base member 20 has been bent by the user so as to project backward when viewed from the user (downward) such that the base member 20 is moved away from the user, the display control section 32 reduces the size of the image being displayed on the display 13. On the other hand, when the base member 20 has been bent by the user so as to project frontward when viewed from the user (upward) such that the base member 20 is moved toward the user, the display control section 32 enlarges the image being displayed on the display 13. As thus described, the operation for moving the base member 20 toward the user corresponds to the enlargement of the image, and the operation for moving the base member 20 away from the user corresponds to the size-reduction of the image. Thus, it is easy for the user to intuitively memorize the operations for bending the base member 20 when the image is enlarged or reduced.

(ii) Switching of Image (Forward/Back of Image)

Figure 11:
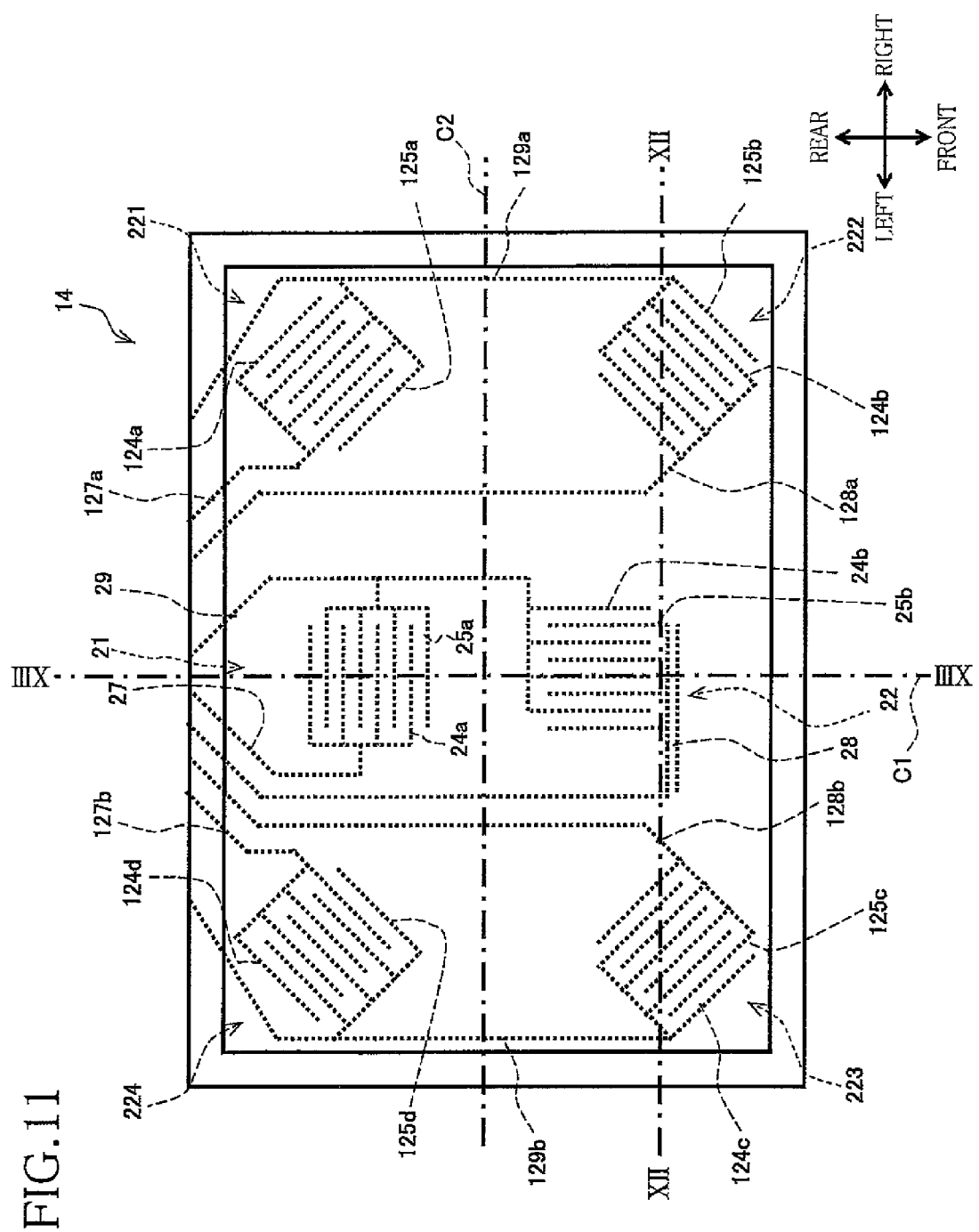
FIG. 11 is a plan view showing a state of the operation device when the operation device is bent about a line C2 so as to project toward a back side of a sheet of FIG. 11.
Figure 12:
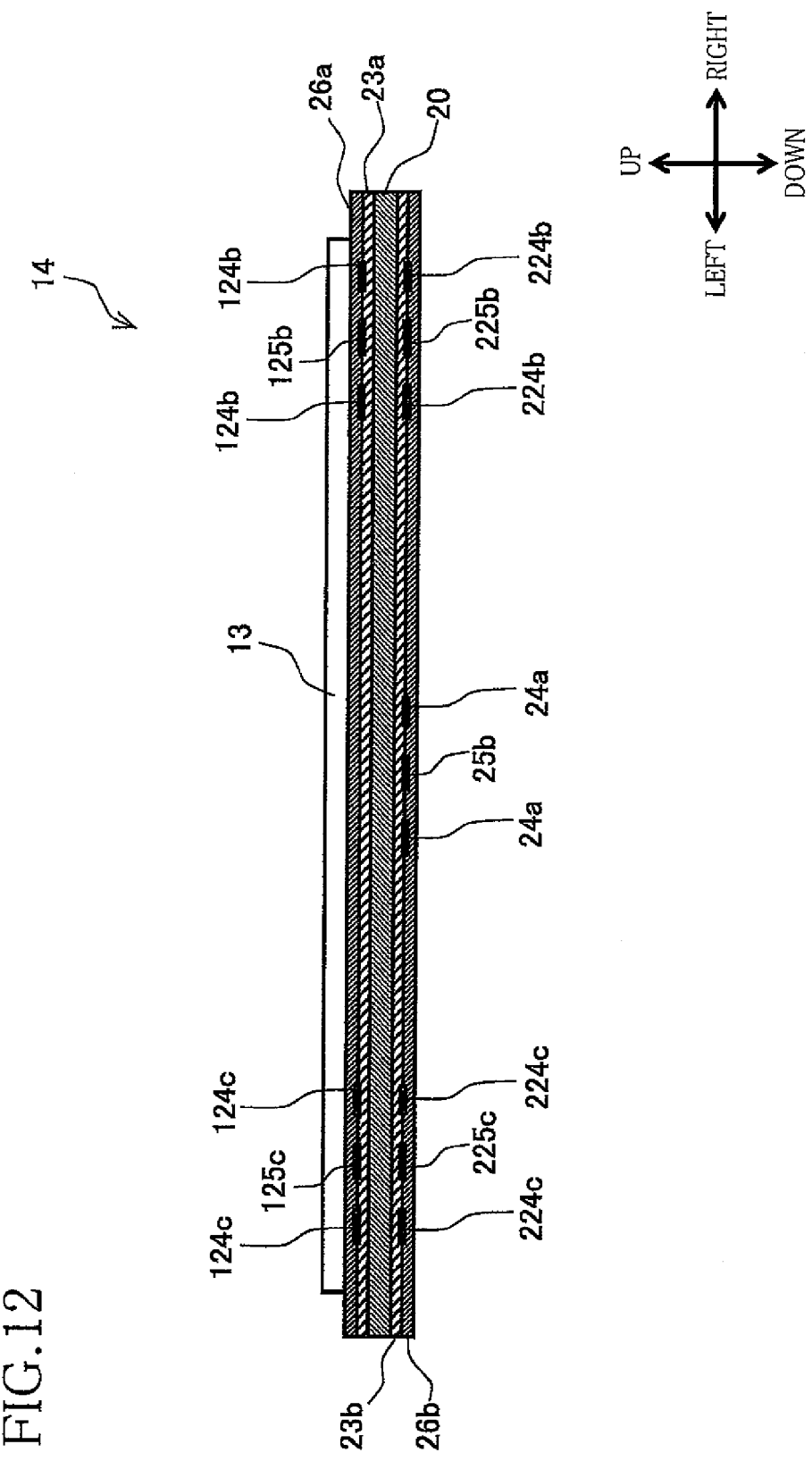
FIG. 12 is a cross-sectional view of the operation device taken along line XII-XII in FIG. 11.

As shown in FIGS. 11-13, when the base member 20 having the rectangular sheet-like shape has been bent by the user about the line C2 parallel to its longitudinal direction so as to project downward (backward when viewed from the user), the face of the piezoelectric layer 23b is elongated in the widthwise direction of the base member 20. Here, when the base member 20 has been bent at a relatively low speed so as to project downward (as indicated by the item C in FIG. 17), a relatively weak electric field in the direction opposite to the polarization direction (in the direction directed from the first electrode 24a toward the second electrode 25a) is generated on the portion of the piezoelectric layer 23b between the first electrode 24a and the second electrode 25a, whereby a relatively low positive electric potential whose absolute value is equal to or lower than a predetermined value occurs in the first electrode 24a. When having received this voltage signal, the output section 132 outputs the bend detection signal having the positive electric potential to the display control section 32.

When having received this signal, the display control section 32 judges that the base member 20 has been bent about the line C1 at a relatively low speed so as to project downward. The display control section 32 then selects image data following the image data being displayed on the display 13 by one data (i.e., first image data after the image data being displayed) among the plurality of the image data stored in the image-data storage section 31 in the above-described order to change the image displayed on the display 13 to an image based on this selected image data.

Figure 14:
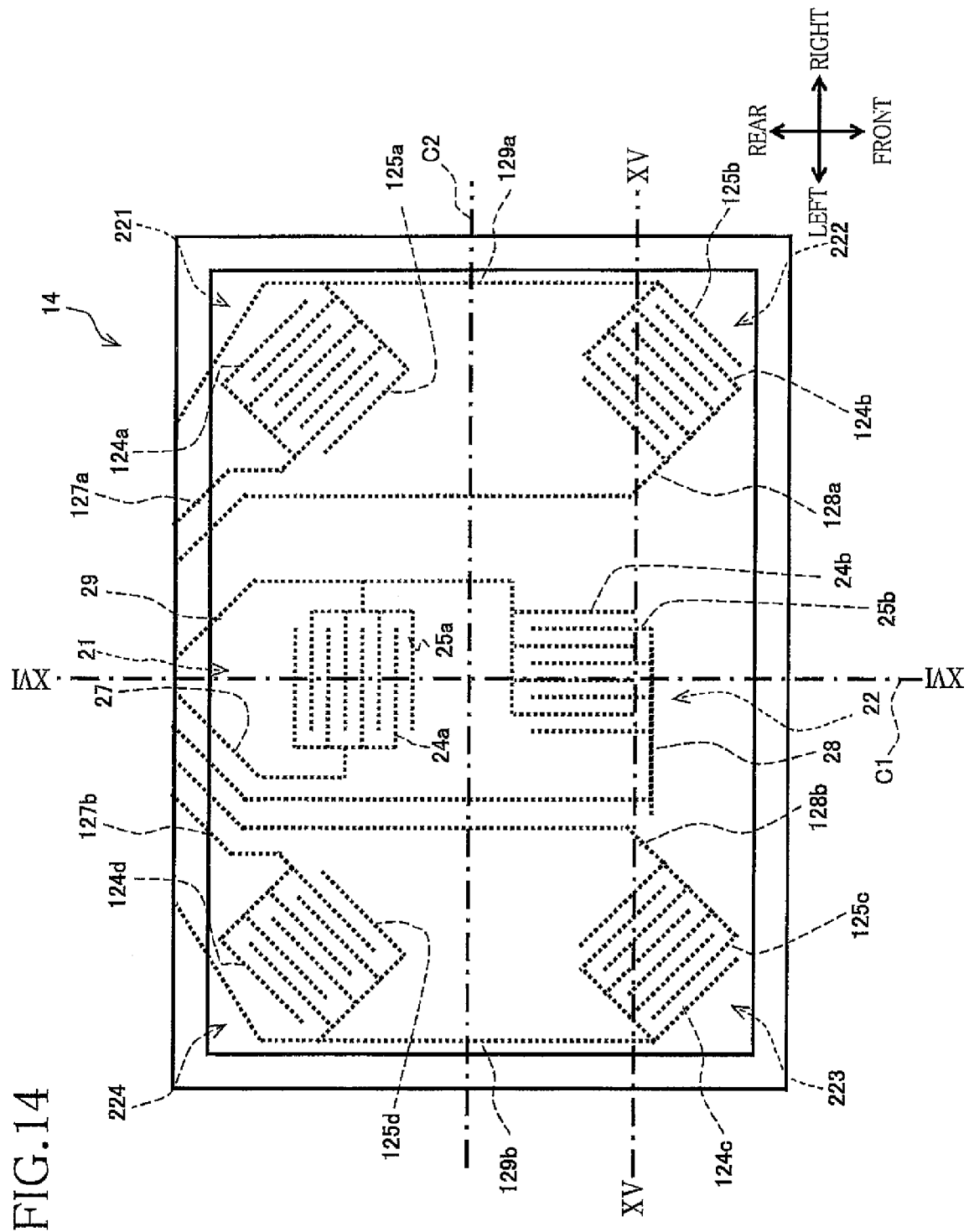
FIG. 14 is a plan view showing a state of the operation device when the operation device is bent about the line C2 so as to project toward a front side of a sheet of FIG. 14.
Figure 15:
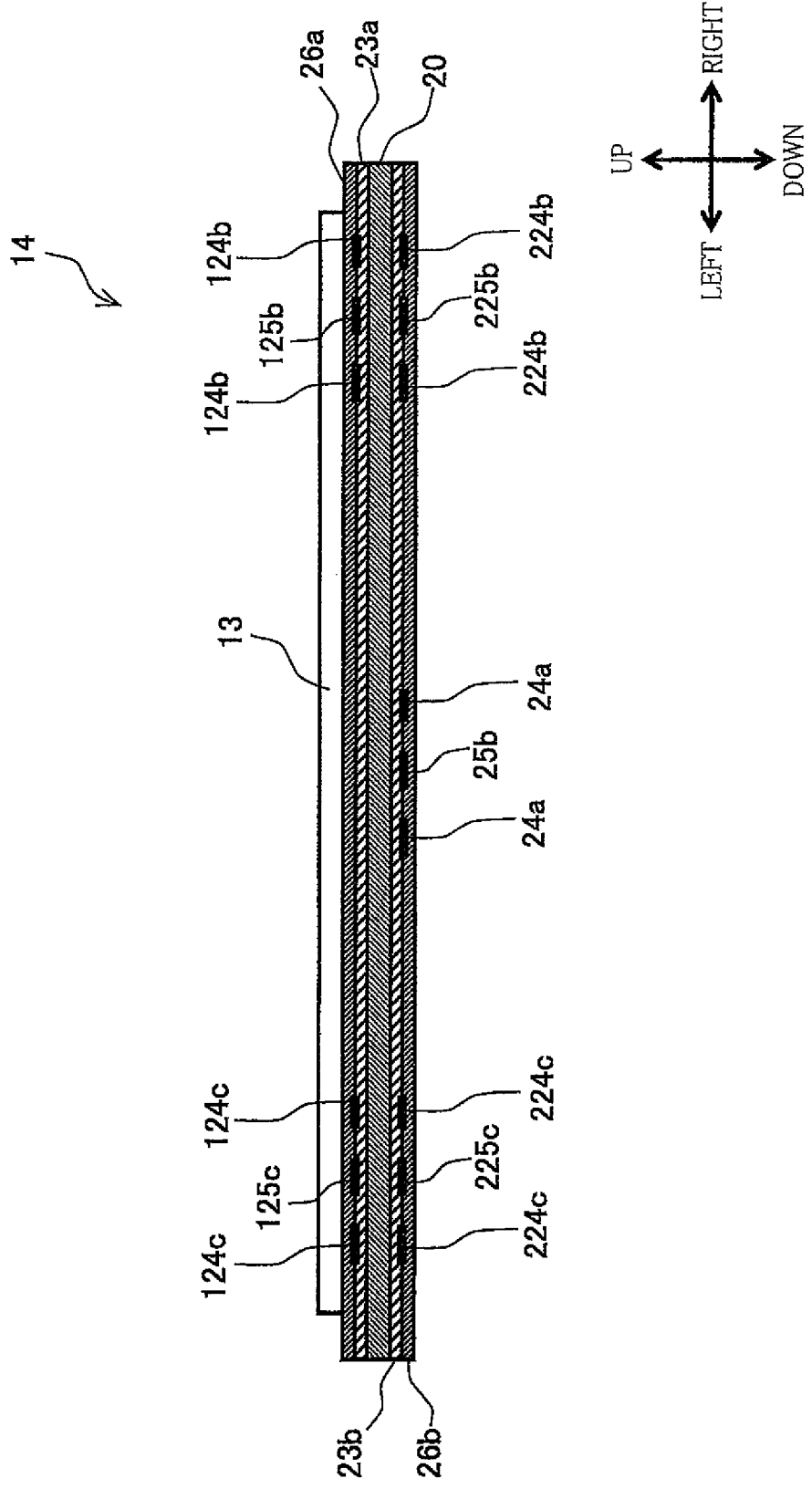
FIG. 15 is a cross-sectional view of the operation device taken along line XV-XV in FIG. 14.

Further, as shown in FIGS. 14-16, when the base member 20 having the rectangular sheet-like shape has been bent by the user about the line C2 parallel to its longitudinal direction so as to project upward (frontward when viewed from the user), the face of the piezoelectric layer 23b is contracted in the widthwise direction of the base member 20. Here, when the base member 20 has been bent at a relatively low speed so as to project upward (as indicated by the item D in FIG. 17), a relatively weak electric field in the polarization direction (in the direction directed from the second electrode 25a toward the first electrode 24a) is generated on the portion of the piezoelectric layer 23b between the first electrode 24a and the second electrode 25a, whereby a relatively low negative electric potential whose absolute value is equal to or lower than the predetermined value occurs in the first electrode 24a. When having received this voltage signal, the output section 132 outputs the bend detection signal having the negative electric potential to the display control section 32.

When having received this signal, the display control section 32 judges that the base member 20 has been bent about the line C2 at a relatively low speed so as to project upward. The display control section 32 then selects image data preceding the image data being displayed on the display 13 by one data (i.e., first image data before the image data being displayed) among the plurality of the image data stored in the image-data storage section 31 in the above-described order to change the image displayed on the display 13 to an image based on this selected image data.

In FIGS. 11-16, the higher the bending speed when the base member 20 is bent so as to project downward or upward, the larger or stronger electric field is generated on the portion of the piezoelectric layer 23b between the first electrode 24a and the second electrode 25a, whereby the absolute value of the electric potential of the first electrode 24a is made larger. Thus, when the absolute value of the electric potential of the first electrode 24a is larger than the predetermined value, the display control section 32 judges that the base member 20 has been bent at a considerably high speed (as indicated by the items E, F in FIG. 17). In this case, the display control section 32 controls the display 13 to change the displayed image forward or backward more roughly (at larger intervals) than in the above-described processings (as indicated by the items C, D in FIG. 17).

That is, where the display control section 32 has judged that the base member 20 has been bent at a considerably high speed so as to project downward, the display control section 32 changes the image displayed on the display 13 to an image following the image being displayed by five images (i.e., a fifth image after the image being displayed). On the other hand, where the display control section 32 has judged that the base member 20 has been bent at a considerably high speed so as to project upward, the display control section 32 changes the image displayed on the display 13 to an image preceding the image being displayed by five images (a fifth image before the image being displayed).

That is, where the user knows that the image being displayed is considerably far from an image the user wants to display in terms of the order, the user can bend the base member 20 at a relatively high speed to change the image forward or backward by five images such that the image displayed on the display 13 approaches the desired image within a relatively short time. When the displayed image has been changed to be relatively near the desired image, the user can bend the base member 20 at a relatively low speed to change the image forward or backward by one image while checking whether the displayed image is the desired image or not.

(iii) Switching of Image (Displaying Home Screen or Detailed Information of Image Data)

For example, when the user has nipped the lower left corner portion of the base member 20 (see FIGS. 5 and 6), the portion of the base member 20 which has been nipped by the user is elongated in its longitudinal direction (in a rightward and leftward direction in FIG. 5) and in its widthwise direction (in a frontward and rearward direction in FIG. 5). At this time, portions of the piezoelectric layer 23a and the piezoelectric layer 23b at the lower left corner portion of the base member 20 are elongated in the longitudinal direction and the widthwise direction. As a result, the electric field in the direction opposite to the polarization direction (in the direction directed from the first electrode 24b toward the second electrode 25b) is generated on the portions of the piezoelectric layers 23a, 23b between the first electrode 124b and the second electrode 125b, whereby positive electric potentials occur in the first electrode 124b and the third electrode 224b. When having received this voltage signal, the output section 132 outputs, to the display control section 32, a nip detection signal having information that the nip detecting portion 222 has detected the nip.

When having received this signal, the display control section 32 executes a processing for changing the image displayed on the display 13 to the home screen on which the list of functions of the printer are displayed.

As thus described, the processing the controller 4 controls the recording control section 30 and the display control section 32 to execute can be changed between the case where the user has nipped the base member 20 and the case where the user has bent the base member 20.

When the user has nipped the upper right corner portion of the base member 20 after the desired image has been displayed on the display 13, the portion of the piezoelectric layer 23a between the first electrode 124a and the second electrode 125a and the portion of the piezoelectric layer 23b between the third electrode 224a and the fourth electrode 225a are elongated in the direction parallel to the polarization direction. As a result, the electric field in the direction opposite to the polarization direction (in the direction directed from the first electrode 24b toward the second electrode 25b) is generated on the portion of the piezoelectric layer 23a between the first electrode 124a and the second electrode 125a and the portion of the piezoelectric layer 23b between the third electrode 224a and the fourth electrode 225a, whereby positive electric potentials occur in the first electrode 124a and the third electrode 224a. When having received this voltage signal, the output section 132 outputs, to the display control section 32, a nip detection signal having information that the nip detecting portion 221 has detected the nip.

When having received this signal, the recording control section 30 executes a processing for recording the image on the recording sheet P. Further, when the user has nipped the upper left corner portion of the base member 20 while the recording control section 30 is executing the processing for recording the image on the recording sheet P, the recording control section 30 executes a processing for canceling or stopping the recording processing. It is noted that, where the user has simultaneously nipped the upper right corner portion and the upper left corner portion of the base member 20, and thereby the voltage signals of the nip detecting portion 221 and the nip detecting portion 222 have been simultaneously inputted into the output section 132, the output section 132 transmits a signal to the display control section 32 such that the display 13 displays an error message.

In the printer as the present embodiment, when the user has deformed the flexible base member 20 having the sheet shape like bending a paper, the two bend detecting portions 21, 22 detect this deformation of the base member 20, and the image displayed on the display 13 is changed by the display control section 32 on the basis of the detected deformation. Further, when the user has nipped the flexible base member 20 having the sheet shape like nipping a paper, the nipping operation is detected by at least one of the nip detecting portions 221-224, based on which the display control section 32 can change the image displayed on the display 13, record the image displayed on the display 13 on the recording sheet P, and or cancel the recording.

Further, in the printer as the present embodiment, the user only needs to perform the simple operation such as the bending of the base member 20 and the nip of the base member 20 to enlarge/reduce the image, change (switch) the image forward or backward, record the displayed image on the sheet P, and cancel the recording. Thus, there is no need for the user to perform a complicated operation of the plurality of the operation buttons 12 to select and perform a desired function, making it possible even for the user who does not operate the printer well to easily operate the printer.

Further, in the printer as the present embodiment, the nip detecting portions 221-224 are arranged so as to be distant from one another. Thus, when the user has nipped one of the nip detecting portions, the user's finger does not contact another nip detecting portion, resulting in less misoperations.

Further, the entire display 13 has the flexibility, and the display 13 is provided on the base member 20 so as to be deformable together with the base member 20. Thus, while viewing the image being displayed on the display 13, the user can bend the base member 20 located under the display 13 to change the image displayed on the display 13.

Further, each of the first electrodes 124a-124d and the second electrodes 125a-125d is disposed on the portion of the piezoelectric layer 23a which corresponds to one of the four corners, and each of the third electrodes 224a-224d and the fourth electrodes 225a-225d is disposed on the portion of the piezoelectric layer 23b which corresponds to one of the four corners. When the user has nipped one of the four corners of the base member 20, a corresponding one of the nip detecting portions 221-224 detects the base member is being nipped. Thus, it is easy for the user to nip the first electrode and the second electrode. Further, the user can easily recognize positions of the electrodes when compared with a case where the electrodes are disposed at another position of the base member 20.

There will be next explained modifications of the printer 1 as the above-described embodiment. It is noted that the same reference numerals as used in the above-described embodiment are used to designate the corresponding elements of the following modifications, and an explanation of which is dispensed with.

First Modification

For example, the configuration and the number of the bend detecting portions for detecting the bending deformation of the base member and the positions of the bend detecting portions on the base member are not limited to those in the above-described embodiment and may be modified as described below.

Figure 18:
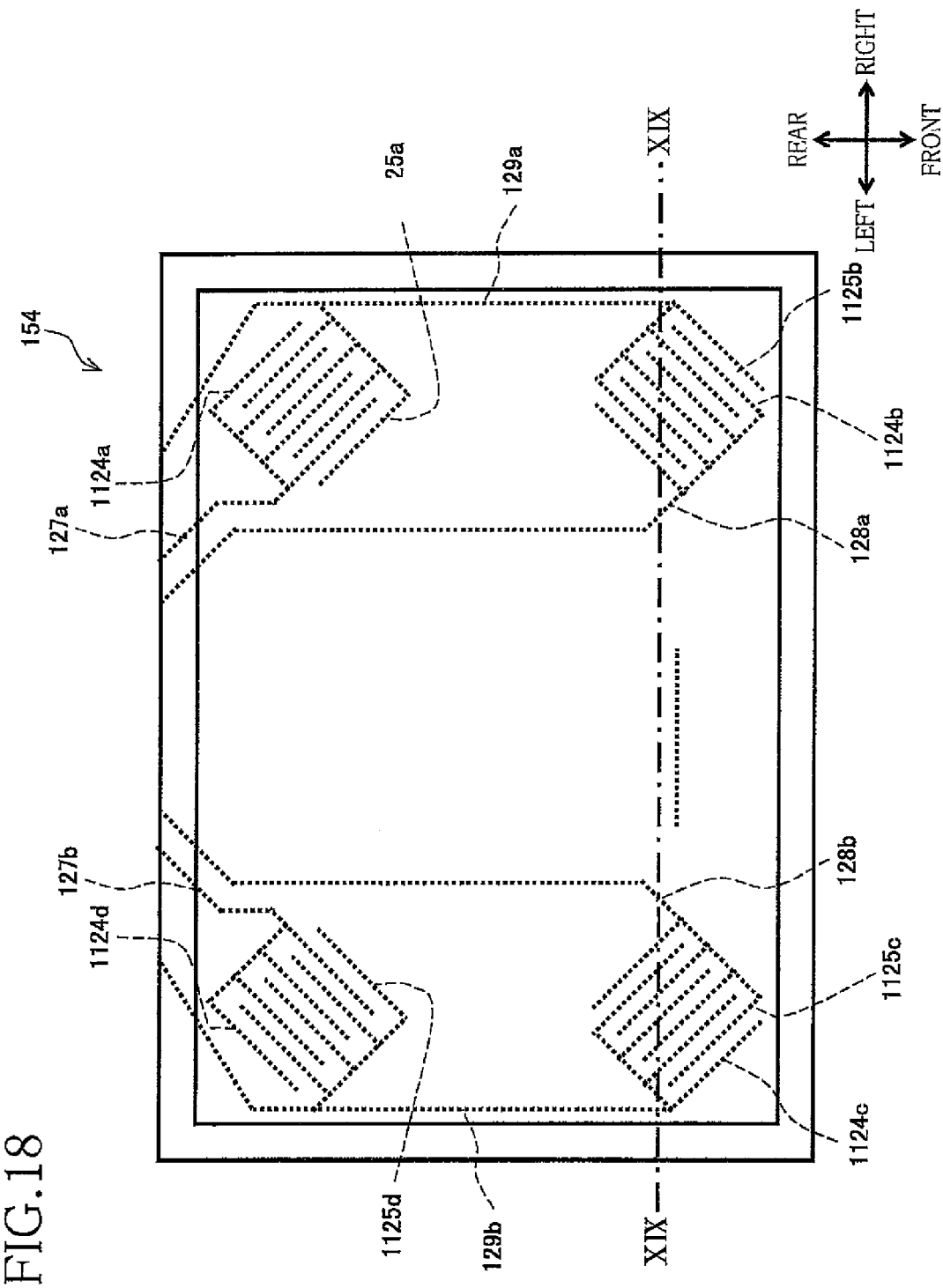
FIG. 18 is a plan view showing an operation device as a first modification.
Figure 19:
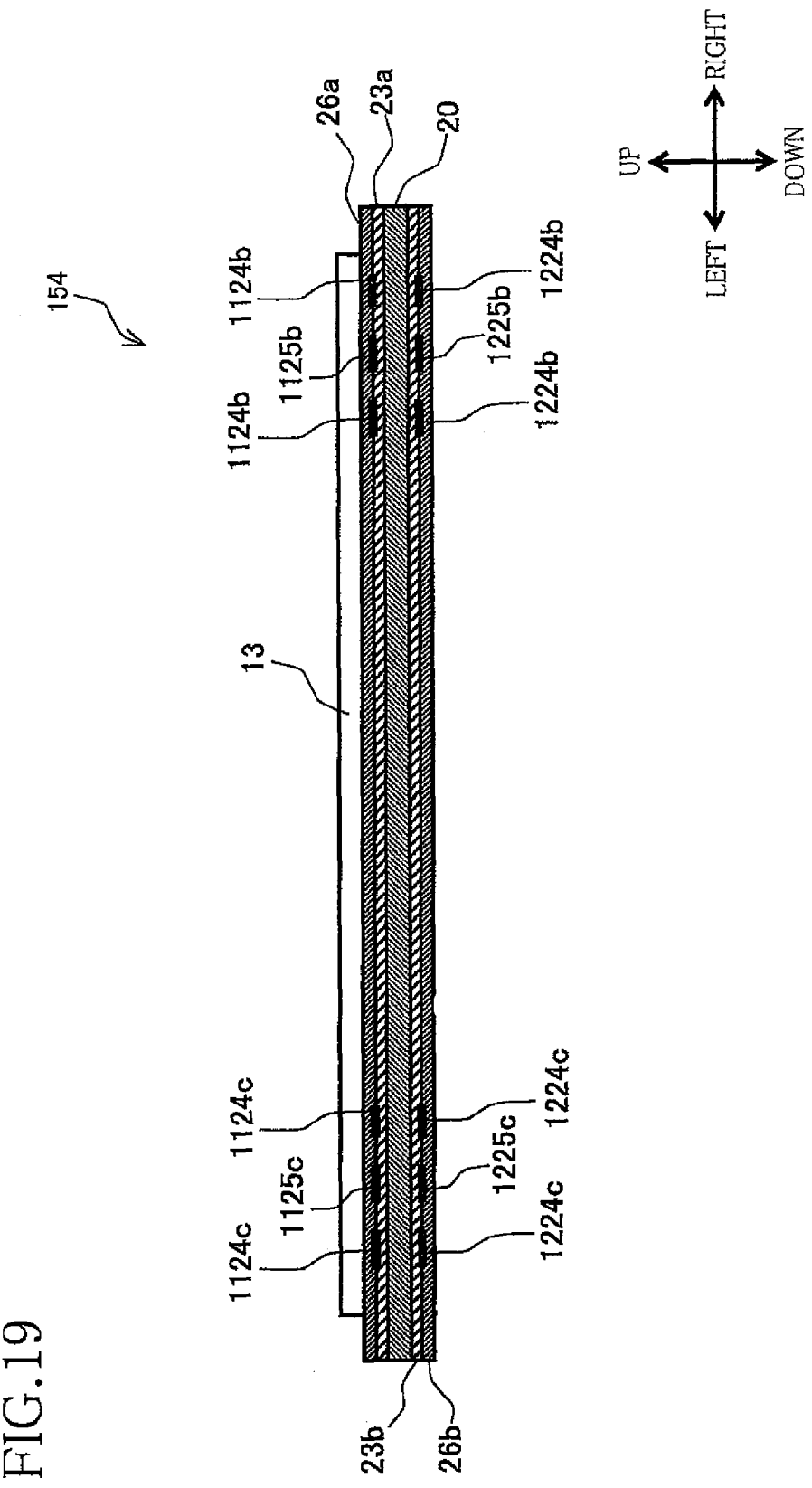
FIG. 19 is a cross-sectional view of the operation device taken along line XIX-XIX in FIG. 18.
Figure 20:
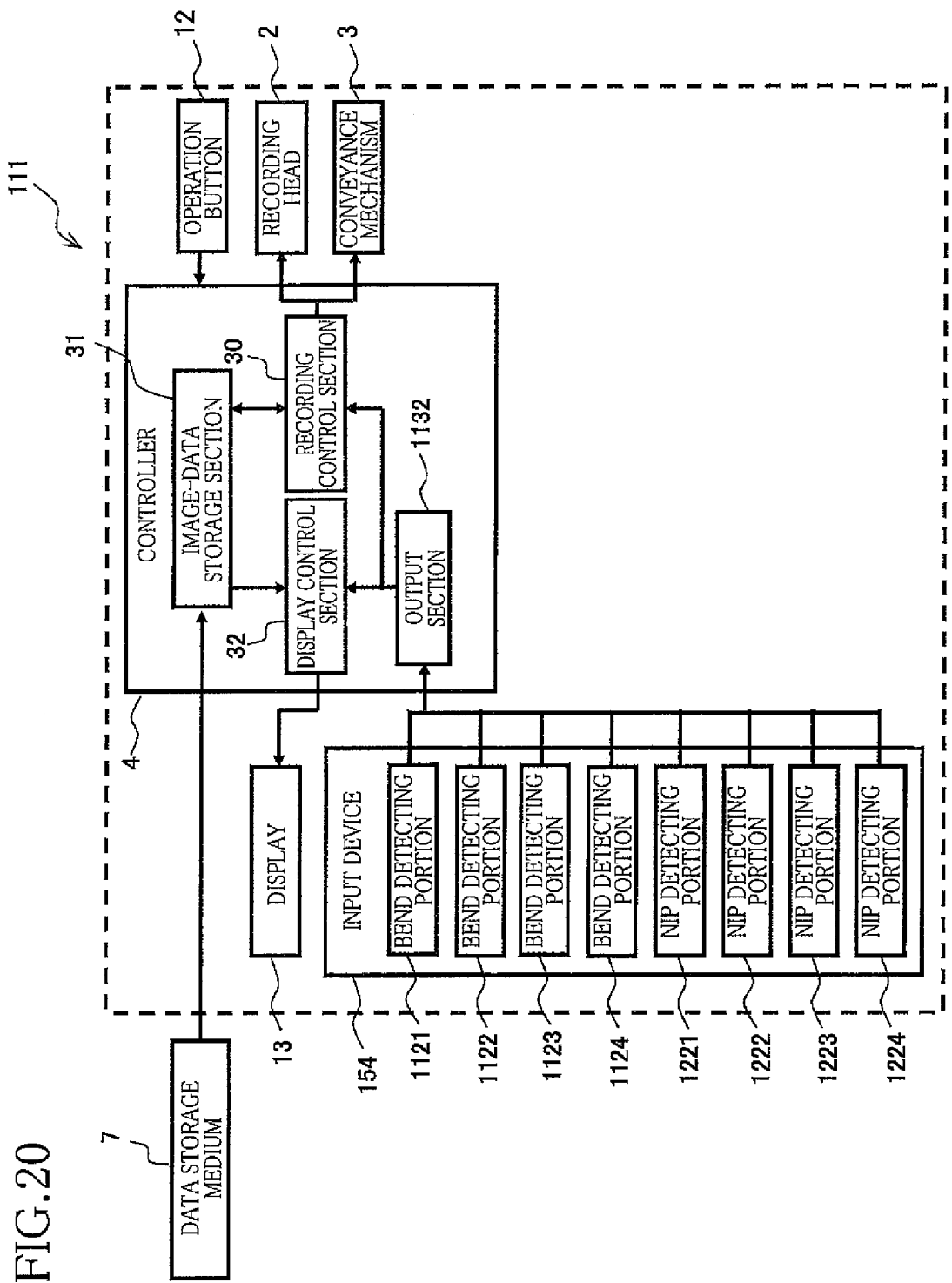
FIG. 20 is a view schematically showing an electric configuration of a printer as the first modification.

As shown in FIGS. 18-20, a printer 111 includes an input device 154 having the base member 20. Each of four first electrodes 1124a-1124d, four second electrodes 1125a-1125d, four third electrodes 1224a-1224d, and four fourth electrodes 1225a-1225d is disposed on a corresponding one of the four corner portions of the base member 20. Each of these electrodes is connected to a corresponding one of four bend detecting portions 1121, 1122, 1123, 1124 and four nip detecting portions 1221, 1222, 1223, 1224 provided on the input device 154 which are shown in FIG. 20. The four bend detecting portions 1121, 1122, 1123, 1124 and the four nip detecting portions 1221, 1222, 1223, 1224 are connected to an output section 1132 of the input device 154.

Here, there will be explained that the output section 1132 distinguish and recognize the bending deformation and the nip of the base member 20.

Figure 21:
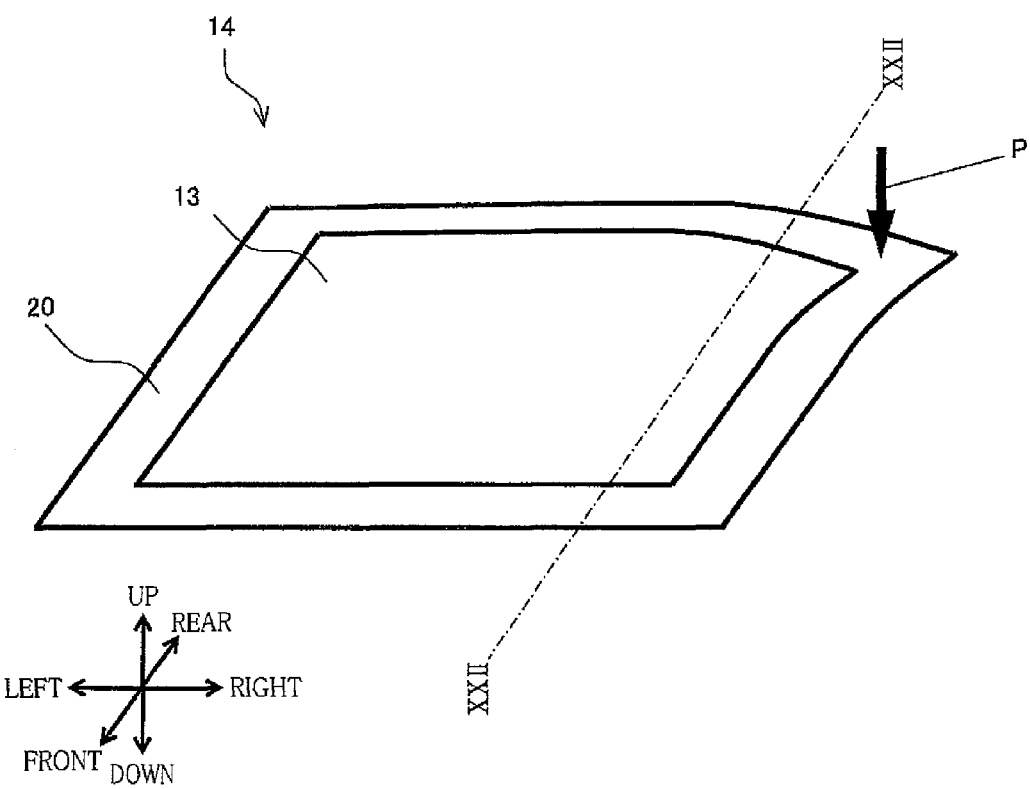
FIG. 21 is a perspective view generally showing a state in which an upper right corner portion of the operation device in the first modification is bent toward its back face.
Figure 22:
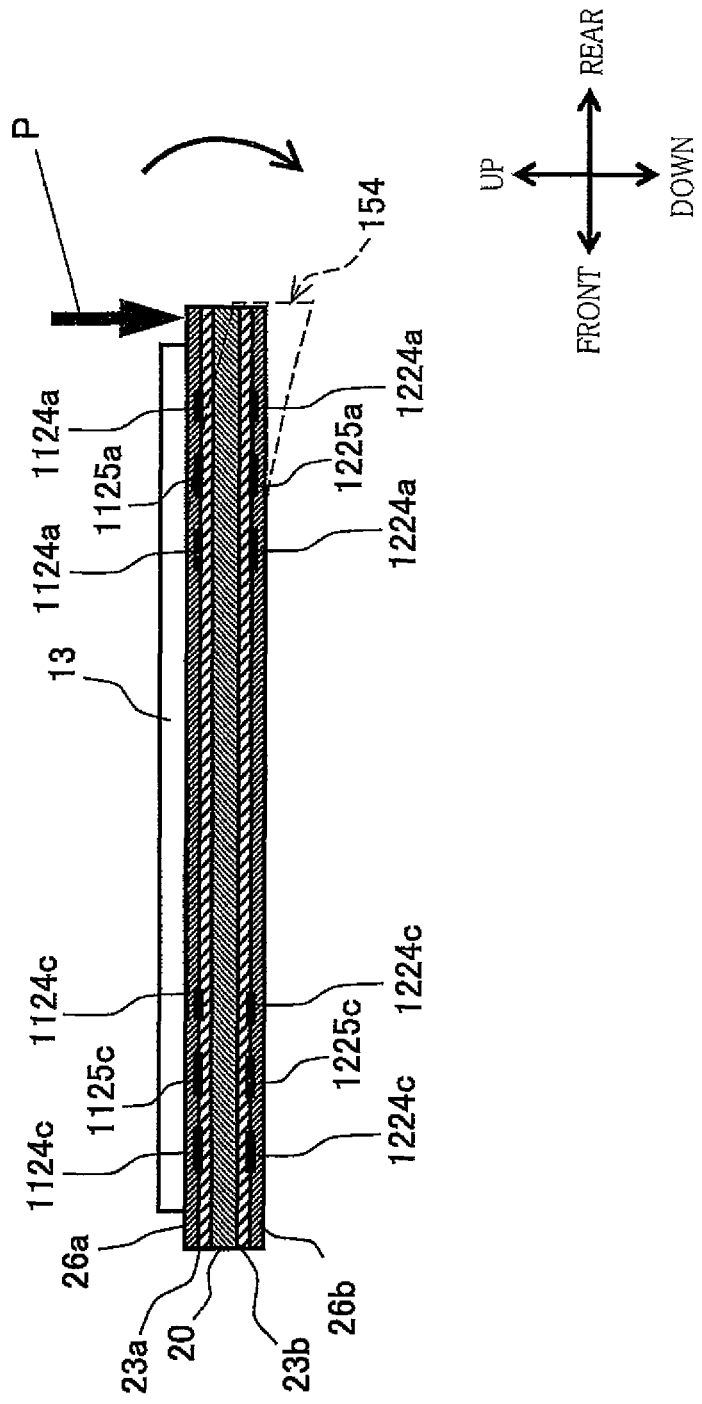
FIG. 22 is a cross-sectional view of the operation device taken along line XXII-XXII in FIG. 21.

For example, as shown in FIGS. 21 and 22, when the user has pressed the upper right corner portion of the base member 20 in a direction indicated by arrow P, the base member 20 is bent such that the pressed portion thereof is moved downward, and thereby a portion of the piezoelectric layer 23a between the first electrode 1124a and the second electrode 1125a is elongated. As a result, a positive electric potential higher than an electric potential of the second electrode 1125a occurs in the first electrode 1124a. In contrast, since a portion of the piezoelectric layer 23b between the third electrode 1224a and the fourth electrode 1225a is contracted, a negative electric potential lower than an electric potential of the fourth electrode 1225a occurs in the third electrode 1224a. The bend detecting portion 1121 outputs the bend detection signal to the output section 1132 on the basis of voltage signals outputted from the first electrode 1124a and the third electrode 1224a.

Figure 23:
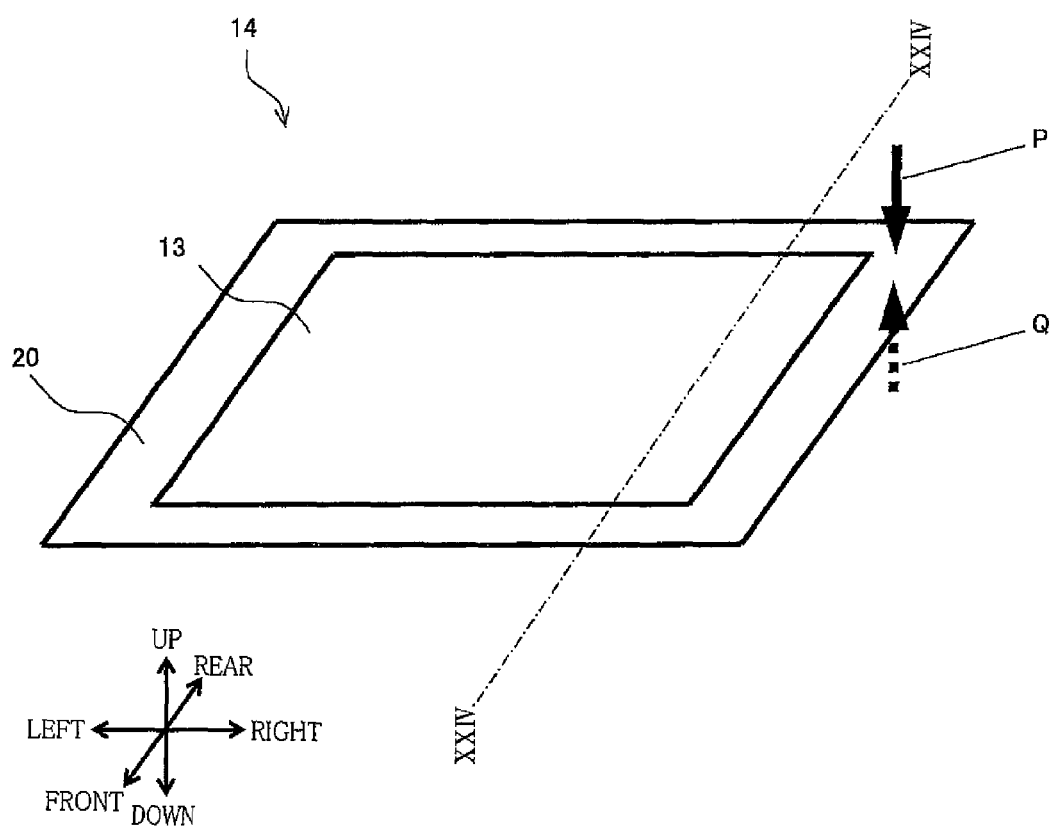
FIG. 23 is a perspective view generally showing a state in which the upper right corner portion of the operation device in the first modification is nipped by a user.
Figure 24:
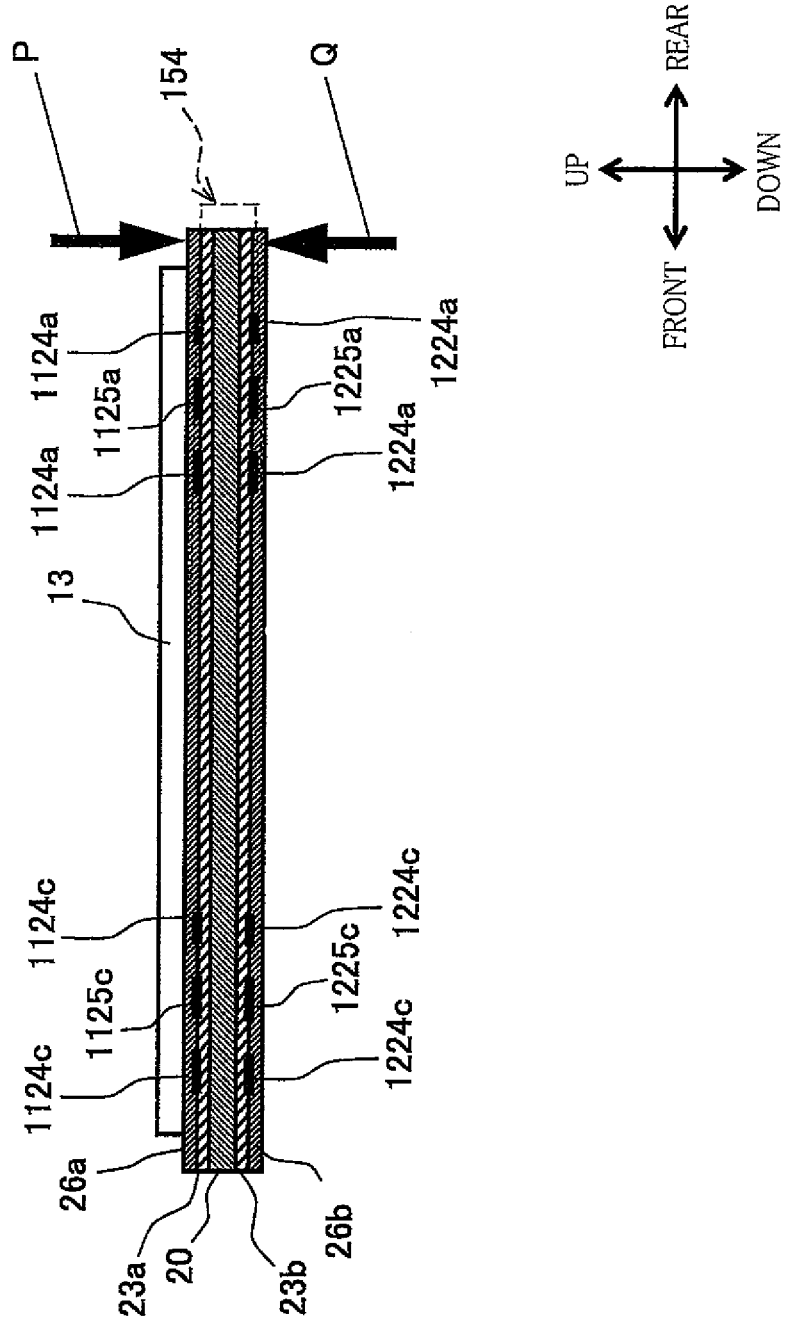
FIG. 24 is a cross-sectional view of the operation device taken along line XXIIII-XXIIII in FIG. 23.

As shown in FIGS. 23 and 24, when the user has nipped the base member 20 so as to press the upper right corner portion of the base member 20 in the direction indicated by the arrow P and a direction indicated by arrow Q, the portion of the piezoelectric layer 23a between the first electrode 1124a and the second electrode 1125a is elongated. As a result, the positive electric potential higher than the electric potential of the second electrode 1125a occurs in the first electrode 1124a. Likewise, since a portion of the piezoelectric layer 23b between the third electrode 1224a and the fourth electrode 1225a is also elongated, a positive electric potential higher than the electric potential of the fourth electrode 1225a occurs in the third electrode 1224a. The nip detecting portion 1221 outputs the nip detection signal to the output section 1132 on the basis of voltage signals outputted from the first electrode 1124a and the third electrode 1224a.

In this configuration, when the user has bent or nipped one of the four corners of the base member 20 while gripping the base member 20, the printer can execute a predetermined function. Thus, the user can easily operate the input device when compared with a configuration that requires the user to change the manner of holding the base member between the bending operation and the nipping operation.

Second Modification

The image change processing may be changed by change of a user's force for nipping the base member 20. For example, where a plurality of images are stored in an external device or a storage portion of the printer, and the user views the images, when the user has nipped the upper right corner portion of the base member 20 with a relatively small (weak) force, an image following the image being displayed by one image (a first image after the image being displayed) is displayed on the display 13. Likewise, when the user has nipped the upper left corner portion of the base member 20 with a relatively small force, an image preceding the image being displayed by one image (a first image before the image being displayed) is displayed on the display 13. When the user has nipped the upper right corner portion of the base member 20 with a relatively large (strong) force, an image following the image being displayed by five images (a fifth image after the image being displayed) is displayed on the display 13. Likewise, when the user has nipped the upper left corner portion of the base member 20 with a relatively large force, an image preceding the image being displayed by five images (a fifth image before the image being displayed) is displayed on the display 13.

Where an amount of the deformation is different between the piezoelectric layer 23a and the piezoelectric layer 23b, a magnitude of the voltage generated on the first electrode is changed. Thus, the potential difference between the first electrode and the second electrode is changed, making it possible to change the electric potential of the electric potential signal to be inputted to the nip detecting portion. As a result, it is possible to perform a control for changing the nip detection signal to be outputted from the nip detecting portion to the output section, on the basis of the magnitude of the voltage generated on the first electrode.

The display 13 may be configured to display thereon movies (the movie images) in addition to the static images. In this case, when the user has nipped the base member 20 with a relatively small force, the movie is played forwardly or reversely at a double speed. When the user has nipped the base member 20 at a relatively large force, the movie is played forwardly or reversely at a five speed (5× speed). As a result, since the user can intuitively operate the printer, the user does not need to remember complicated operations, making it possible to easily operate the printer.

Third Modification

In the above-described embodiment, the first electrodes 24a, 24b and the second electrodes 25a, 25b are disposed on the face of the piezoelectric layer 23b but may be disposed on a back face of the piezoelectric layer 23b. In this case, at least a lower face of the base member 20 needs to have an insulation property such that there is no continuity between the first electrode 24 and the second electrode 25. For example, the lower face of the base member 20 is formed of an insulation material. This modification does not require the insulating layer 26b on the back face of the piezoelectric layer 23b (see FIG. 4) which is for covering the first electrode 24 and the second electrode 25 in the above-described embodiment.

Fourth Modification

Figure 25:
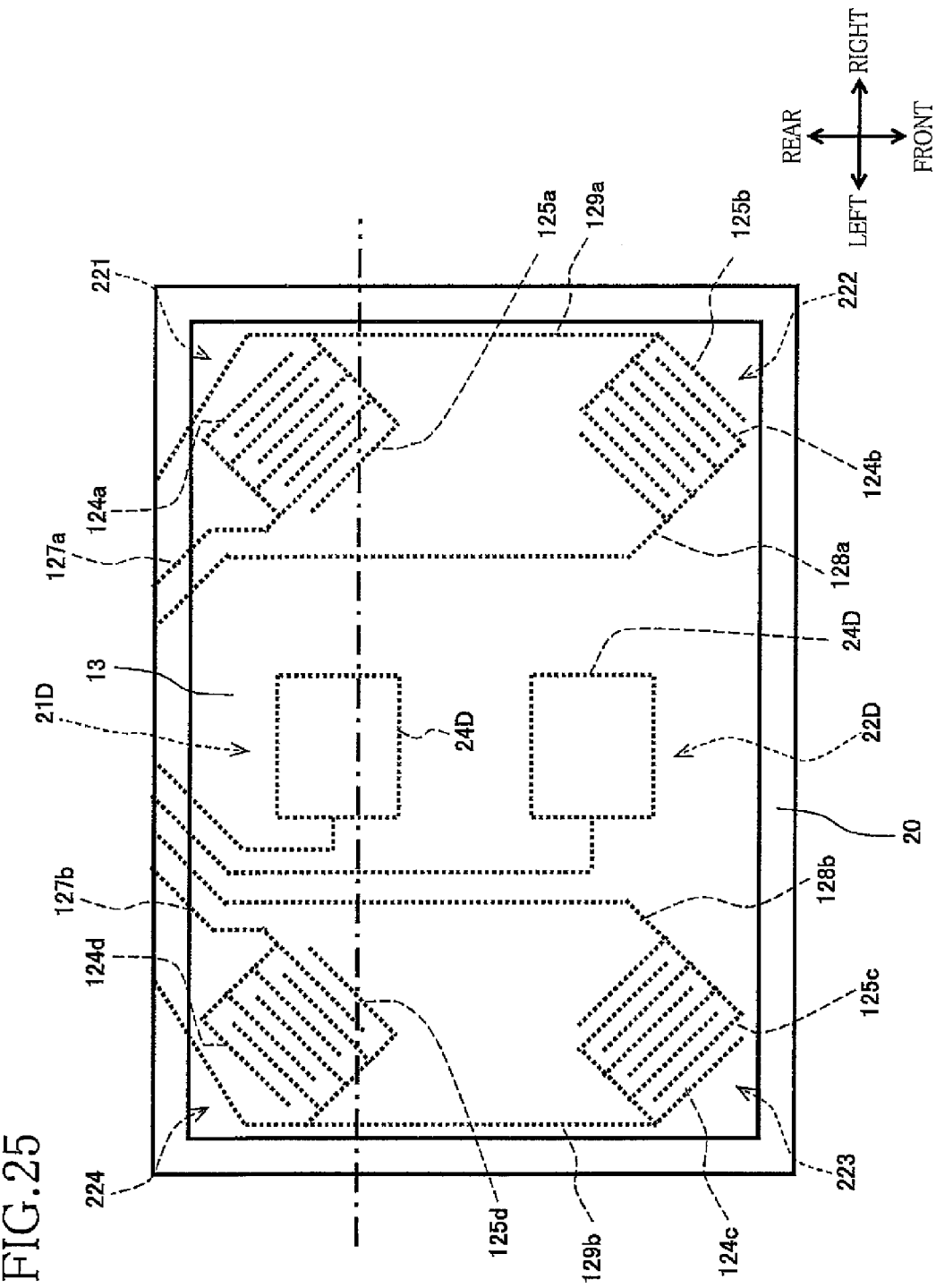
FIG. 25 is a plan view showing an operation device in a fourth modification.

As shown in FIG. 25, the input device may have two types of electrodes arranged on both of opposite faces of the piezoelectric layer 23 so as to interpose the piezoelectric layer 23. In the input device shown in FIG. 25, the base member 20 is provided by a thin plate formed of a metal material, and this base member 20 also functions as a common electrode contacting one of the faces of the piezoelectric layer 23. On the other hand, on a face (a lower face) of the piezoelectric layer 23 which is further from the base member 20, two electrodes 24D each having a rectangular shape in plan view are disposed so as to be opposed to the base member 20 functioning as the common electrode. A single bend detecting portion 21D (or 22D) is constituted by one of the electrodes 24D, the base member 20 as the common electrode, and the piezoelectric layer 23 interposed therebetween. The base member 20 as the common electrode is kept at a ground potential.

In this fourth modification, when the base member 20 has been bent, and thereby a portion of the piezoelectric layer 23 between each electrode 24D disposed on the lower face and the base member 20 as the common electrode on an upper face of the layer 23 has been strained or distorted, an electric field is generated between each electrode 24D and the base member 20 depending upon this strain. As a result, a positive electric potential or a negative electric potential occurs in the electrodes 24D, making it possible to detect the bending deformation of the base member 20.

It is noted that, in the example in FIG. 25, the metal base member 20 also functions as the electrode opposed to the electrodes 24D with the piezoelectric layer 23 interposed between the metal base member 20 and the electrodes 24D, but the base member 20 does not need to function as one of the electrodes for interposing the piezoelectric layer 23. For example, an electrode different from the base member 20 may be disposed on a face of the piezoelectric layer 23 which is nearer to the base member 20 than the other face thereof.

Fifth Modification

Figure 26:
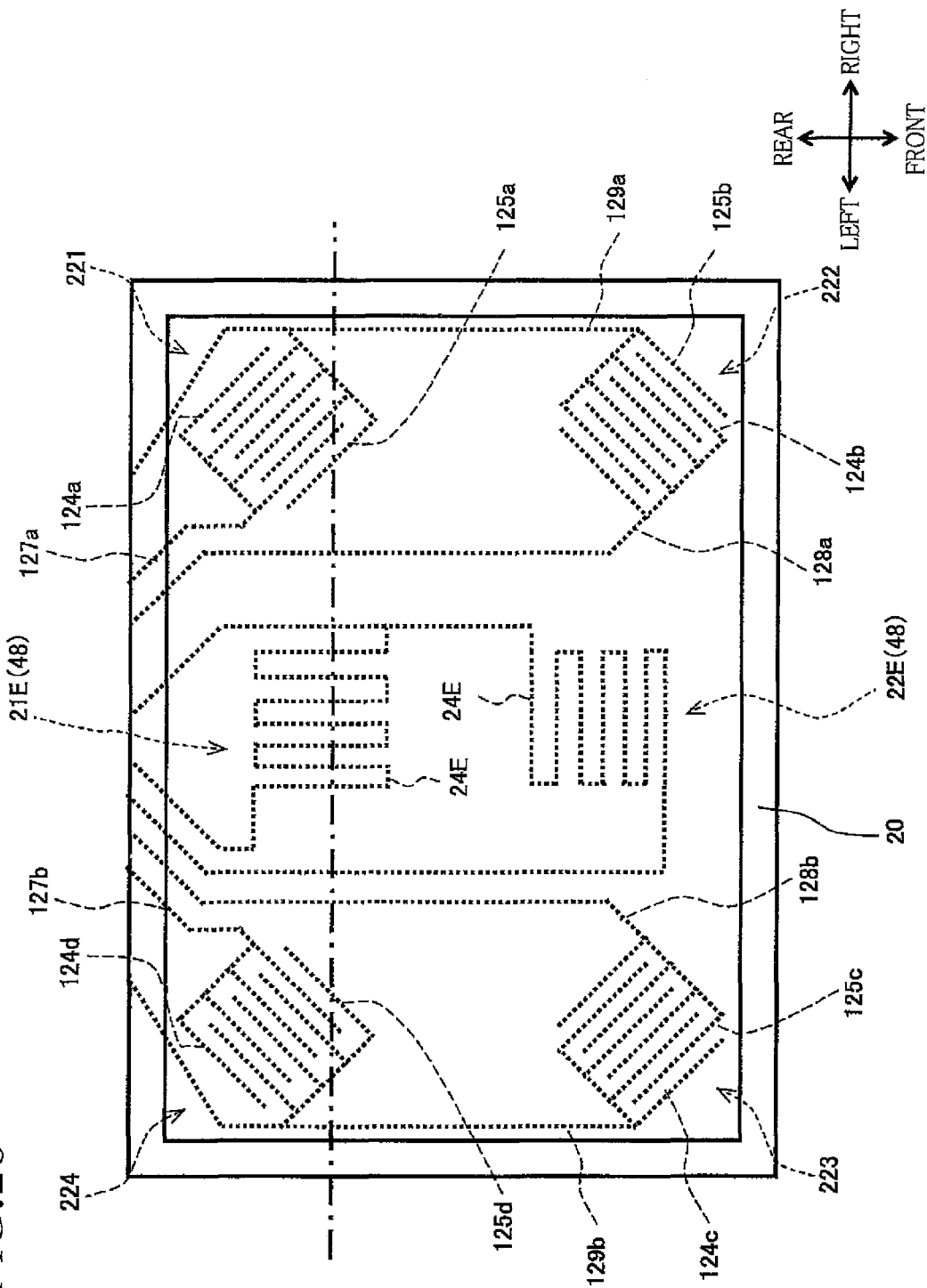
FIG. 26 is a plan view showing an operation device in a fifth modification.

The bend detecting portion is not limited to the use of an electromechanical interaction of the piezoelectric layer (the piezoelectric element). For example, as shown in FIG. 26, the bend detecting portion may be provided by two bend detecting portions 21E, 22E each formed of a conductive material, disposed on the face of the base member 20, and having an electrical resistor 48 (i.e., a strain gauge) whose electrical resistance changes depending upon the bending deformation of the base member 20.

The base member 20 is formed of a resin material having an insulation property, and a face (lower face) of the base member 20 has at least an insulation property. On this lower face having the insulation material are arranged the electrical resistors 48 connected in parallel to each other and each having a zigzag portion 24E. It is noted that the two zigzag portions 24E extend in different directions. In an upper one of the zigzag portions 24E in FIG. 26, long parts thereof extend in the widthwise direction of the base member 20, and in a lower one of the zigzag portions 24E, long parts thereof extend in the longitudinal direction of the base member 20. These two zigzag portions 24E respectively constitute the two bend detecting portions 21E, 22E. On the lower face of the base member 20 is provided the insulating layer 26 so as to cover the entire electrical resistors 48.

In each of the two bend detecting portions 21E, 22E, when the base member 20 has been bent about an axis perpendicular to the direction in which the long parts of the zigzag portion 24E extend, and thereby the electrical resistor 48 of the zigzag portion 24E has been contracted in the direction in which the long parts of the zigzag portion 24E extend, an electrical resistance value of the zigzag portion 24E changes. As a result, the bending deformation of the base member 20 is detected. For example, when the base member 20 has been bent about the line C1 extending in the widthwise direction of the base member 20, the electrical resistor 48 is considerably contracted with the base member 20 in the lower zigzag portion 24E (in FIG. 26) whose long parts extend in the longitudinal direction of the base member 20, and thereby the electrical resistance of the lower zigzag portion 24E changes.

Sixth Modification

Figure 27:
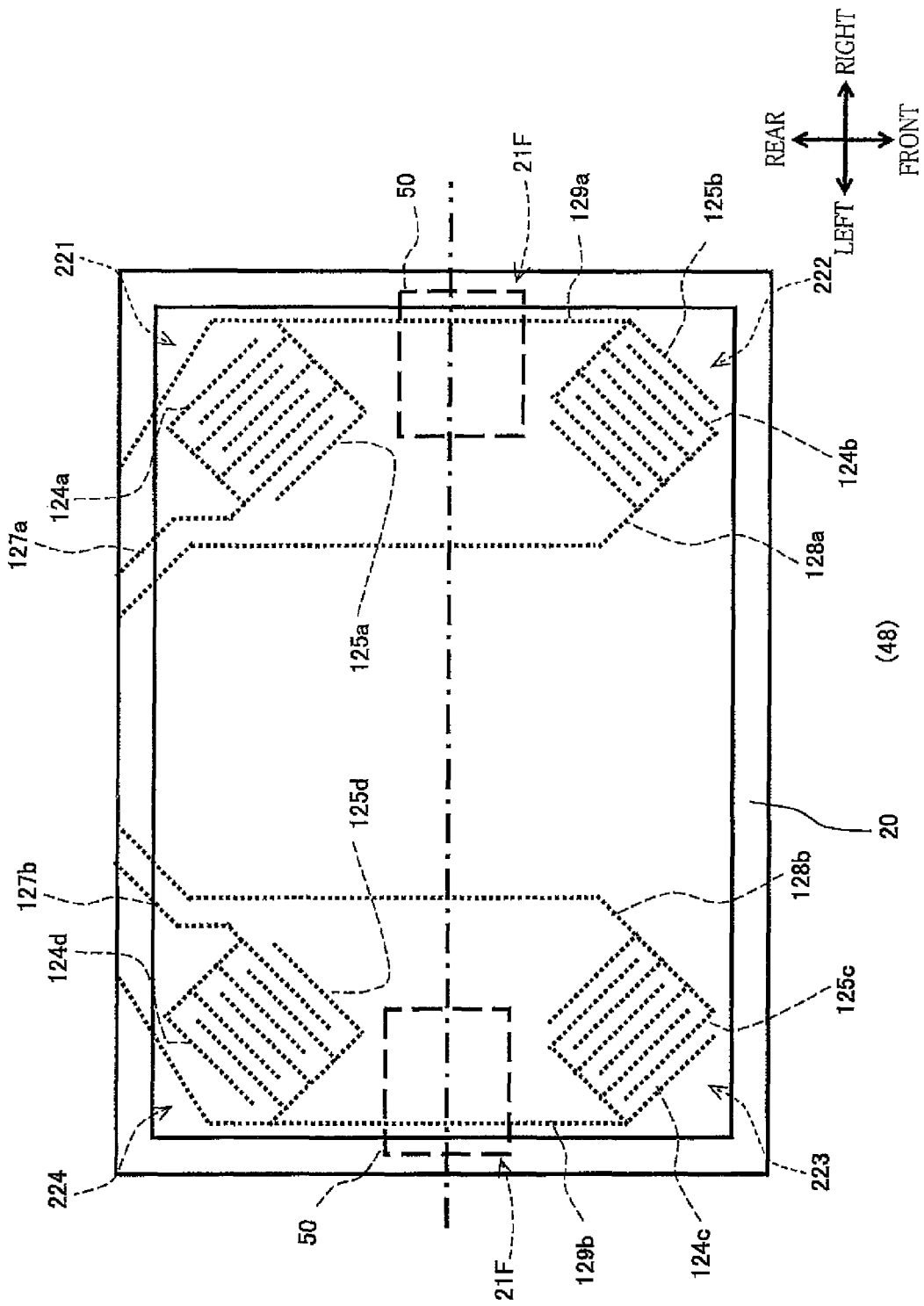
FIG. 27 is a plan view showing an operation device in a sixth modification.

As shown in FIG. 27, the bend detecting portion may be provided by two bend detecting portions 21F respectively including two acceleration sensors 50 respectively arranged on right and left end portions of the face of the base member 20. In this configuration, the two acceleration sensors 50 provided at different positions on the base member 20 can independently detect movements (positional changes) of the respective two positions on the base member 20. This makes it possible to detect the bending deformation of the base member 20 on the basis of the positional changes of the two positions (portions).

Seventh Modification

In the above-described embodiment and its modifications, the image enlargement/reduction processing and the image change processing are assigned to the various types of the bending deformation of the base member 20 which has been detected by the bend detecting portion(s), as the image change processings executed by the display control section 32. However, other processings may be assigned to the bending deformation of the base member 20.

Figure 28A:
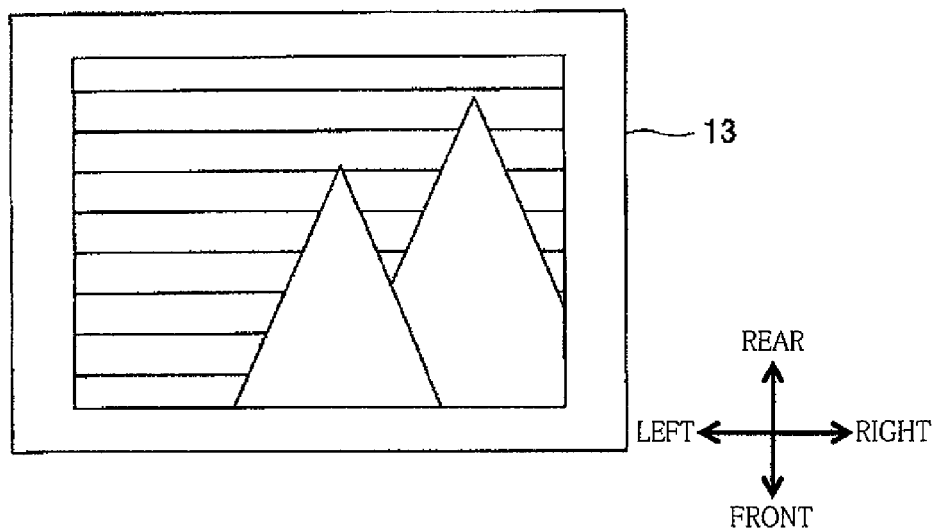
FIGS. 28A and 28B are views for explaining a change of the number of images displayed on a display.
Figure 28B:
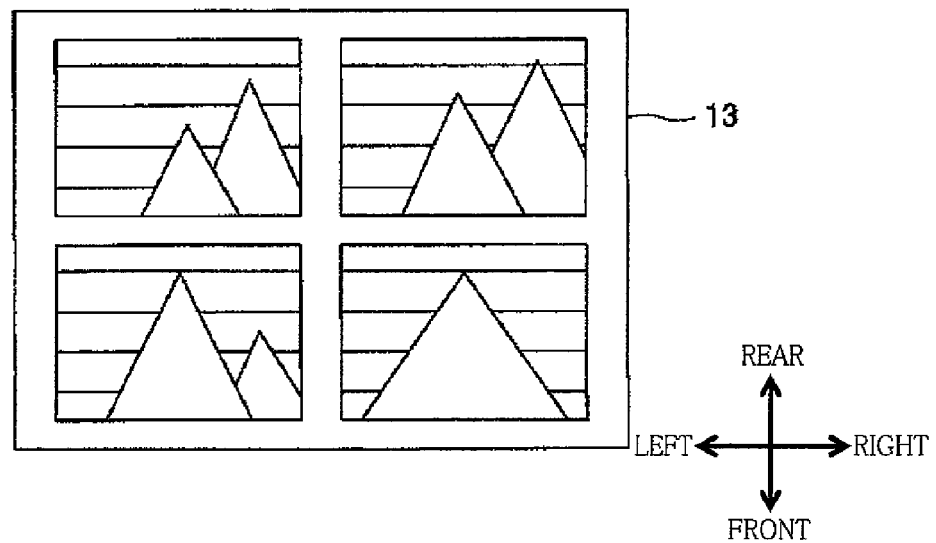

In general, as shown in FIG. 28A, the display control section 32 can control the display 13 to display a single image thereon, but as shown in FIG. 28B, the display control section 32 can also control the display 13 to display a list of a plurality of reduced-size images (thumbnail images). For example, the display control section 32 can control the display 13 to display four reduced-size images. In this configuration, when the bend detecting portion has detected the bending deformation of the base member 20, the display control section 32 may change the number of the images displayed on the display 13 in list form.

Eighth Modification

Figure 29:
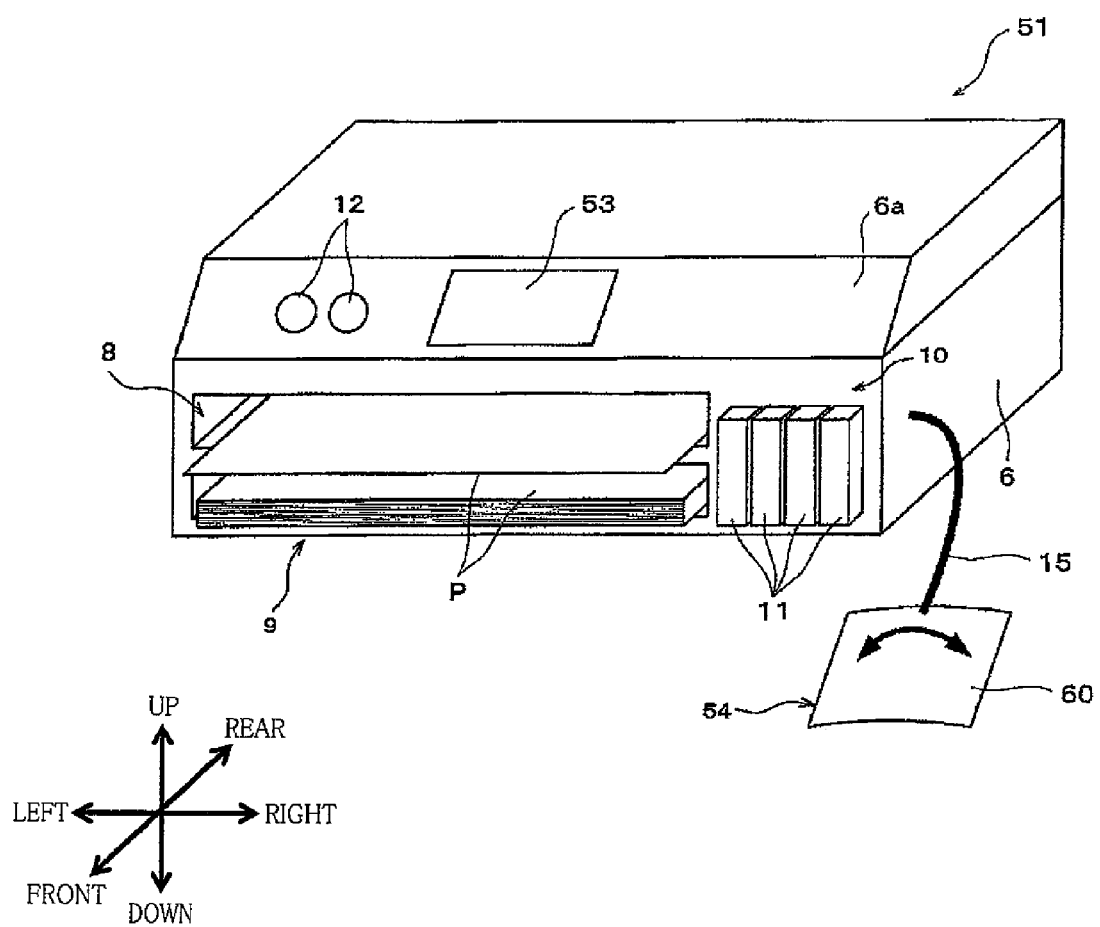
FIG. 29 is a perspective view generally showing a printer as an eighth modification.
Figure 30:
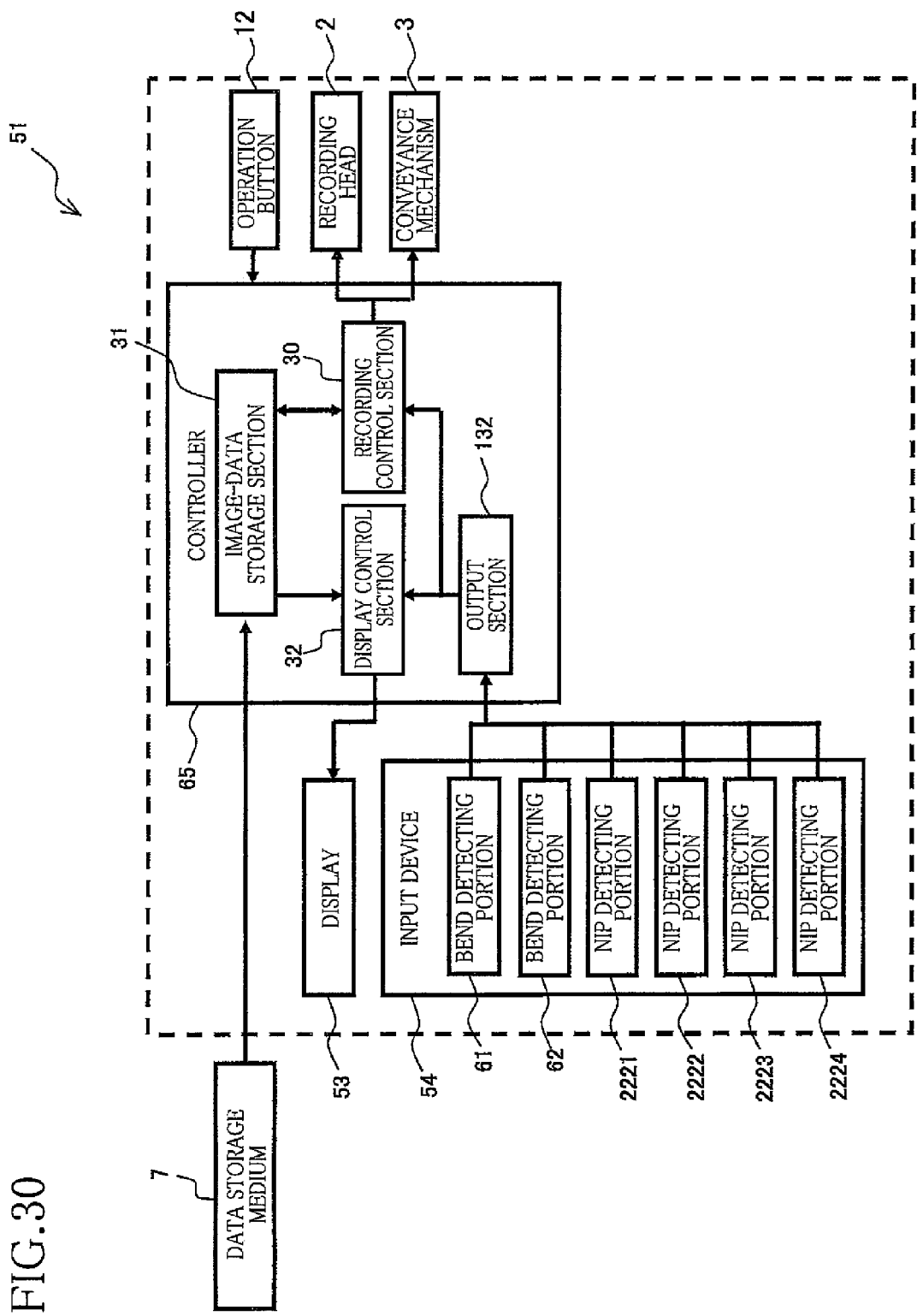
FIG. 30 is a view schematically showing an electric configuration of the printer as the eighth modification.

There will be next explained a printer 51 as an eighth modification with reference to FIGS. 29 and 30. As shown in FIGS. 29 and 30, an input device 54 includes: a flexible base member 60; bend detecting portions 61, 62 for detecting bending deformation of the base member 60; and four nip detecting portions 2221, 2222, 2223, 2224. The input device 54 is connected with the cable 15 to a controller 65 accommodated in the printer main body 6. It is noted that this eighth modification is different from the above-described embodiment in that a display 53 for displaying the image thereon is not provided on the base member 60 of the input device 54 but provided on the inclined face 6a of the upper portion of the printer main body 6 with the operation buttons 12.

Also in this eighth embodiment, the input device 54 detects the bending deformation of the base member 60 by the two bend detecting portions 61, 62 when the user has bent the base member 60. The display control section 32 then changes the image displayed on the display 53, on the basis of the bending deformation of the base member 60 which has been detected by the bend detecting portions 61, 62. These features are the same as those in the above-described embodiment, and a detailed explanation of which is dispensed with.

It is noted that, where the display 53 is provided independently of the base member 60 of the input device 54 as thus described, the construction of the input device 54 is simplified. Further, since the display 53 is provided not integrally with the base member 60, the display 53 does not need to have a flexibility, whereby the user never has difficulty viewing the image owing to the bending deformation of the display 53. Further, the user has never has difficulty viewing the image owing to an overlap of a user's hand with the display 53.

Meanwhile, in the case where the display 53 and the base member 60 of the input device 54 are separated from each other, when the user holds the input device 54 with his or her hand, the user may or may not recognize that a current posture of the base member 60 is a proper (normal) posture that corresponds to an orientation of the image displayed on the display 53. In the case of the user's operation of the base member 60 in a wrong posture, the display 53 may not reflect the intent of the user even if the user has thought that the user had bent the base member 60 properly. In order to solve this problem, the printer 51 preferably includes a configuration for having the user recognize a proper usage posture or recognize the current posture of the base member 60. There will be next explained examples of such a configuration.

Ninth Modification

Figure 31:
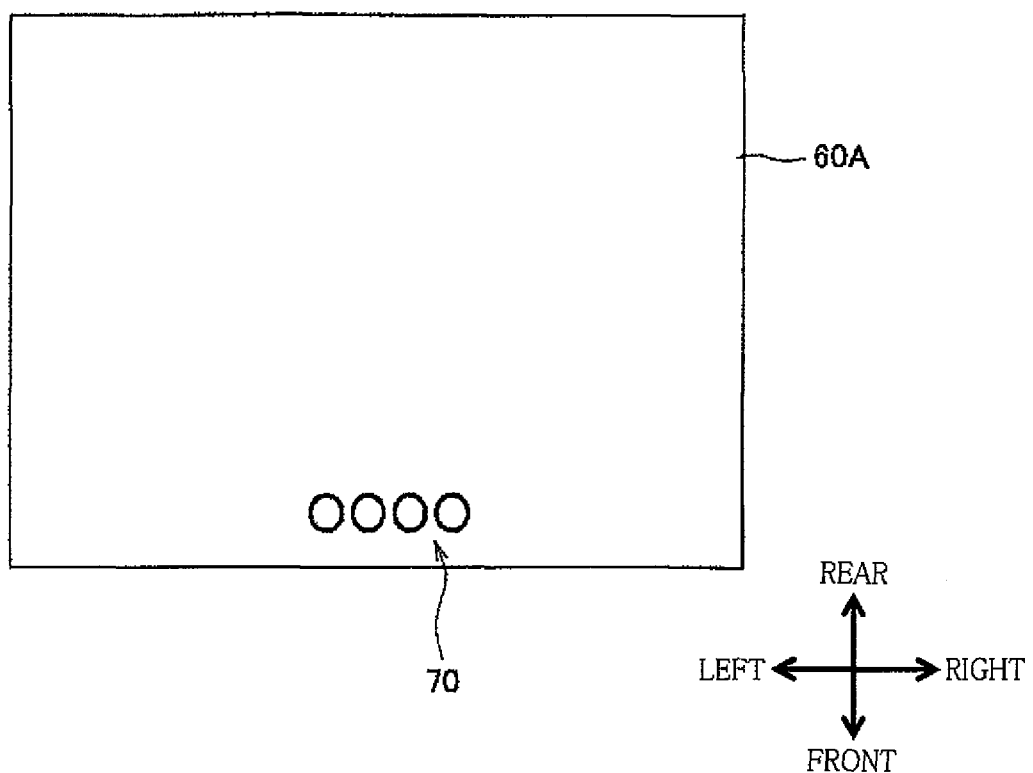
FIG. 31 is a view showing one example of an operation device having a posture identifier portion.

The base member 60 may have a posture identifier portion provided thereon for having the user recognize the proper usage posture of the base member 60. For example, as shown in FIG. 31, an identifier portion 70 such as letters and marks may be provided on a portion of a base member 60A. In this configuration, the user can check whether or not the identifier portion 70 (e.g., the letters and the marks) is inclined or inverted, whereby the user can recognize at a glance whether the base member 60A is in the proper usage posture or not. Alternatively, an arrow mark and/or a message indicating which portion of the base member 60 is an upper portion of the base member 60 in the proper usage posture may be attached to the base member 60.

Figure 32:
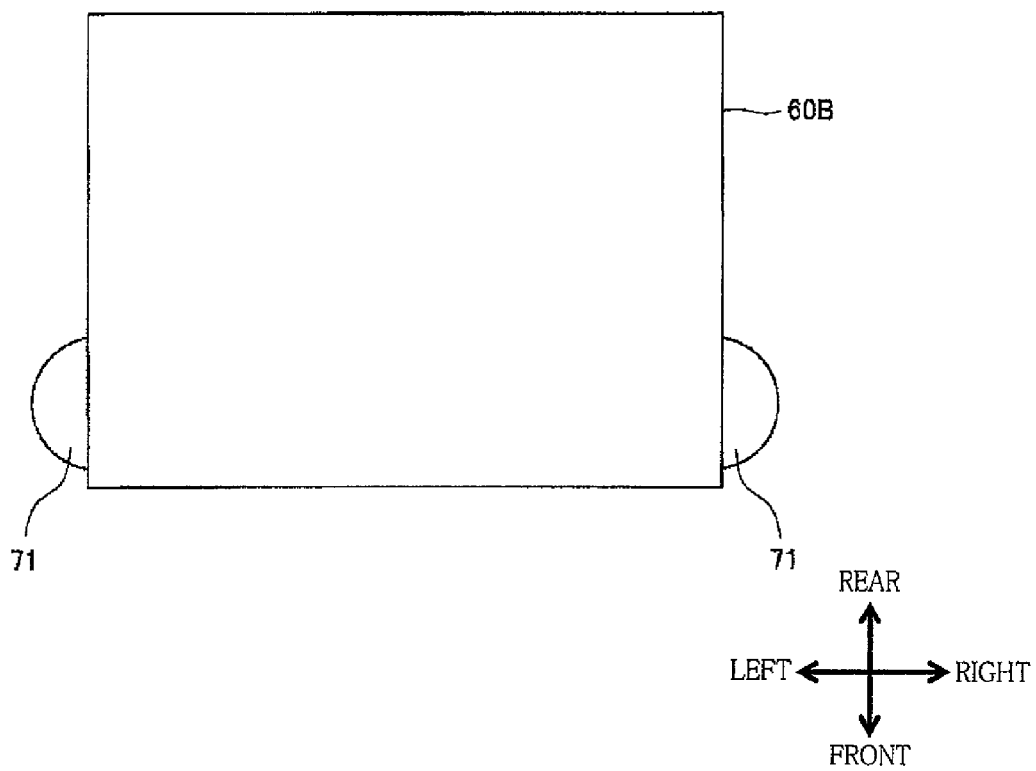
FIG. 32 is a view showing another example of the operation device having the posture identifier portion.

Further, as shown in FIG. 32, grips 71 may be provided on right and left faces of a base member 60B. In this configuration, the user can speedily recognize the proper usage posture of the base member 60B.

Figure 33A:
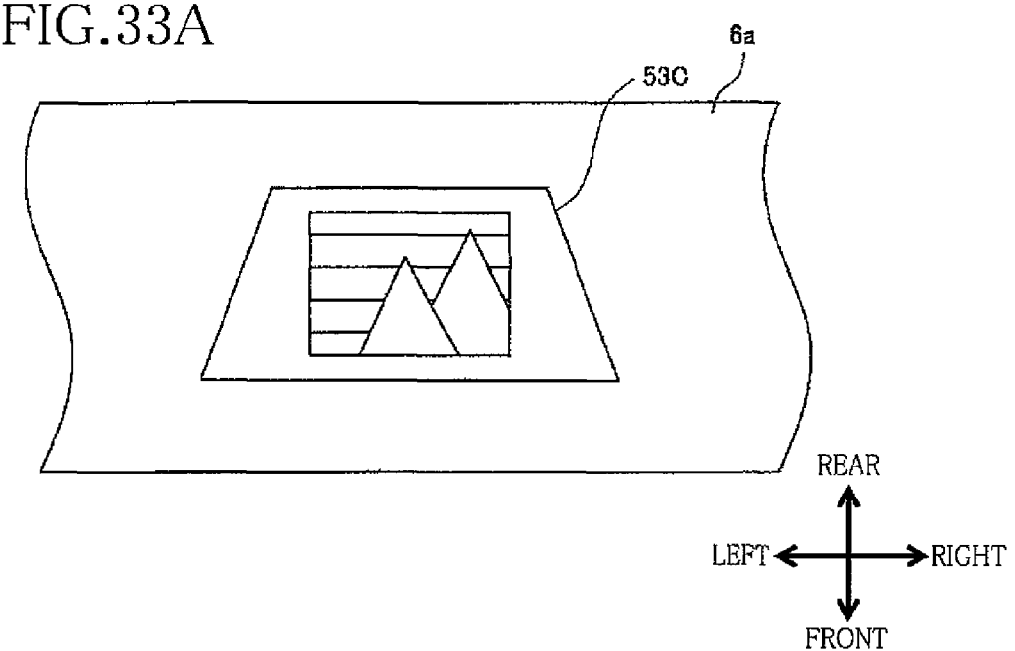
FIGS. 33A and 33B are views showing another example of the operation device having the posture identifier portion.
Figure 33B:
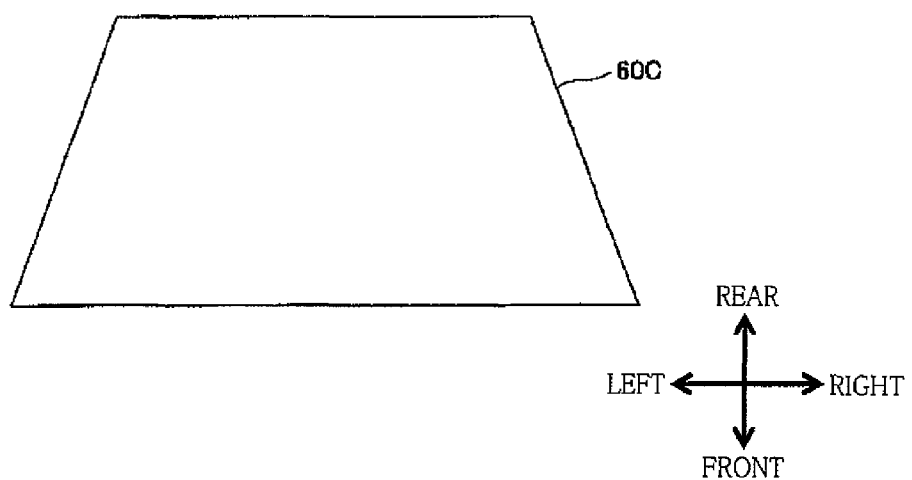

Further, the printer 51 may be configured such that, as shown in FIG. 33A, a display 53C disposed on the inclined face 6a of the printer main body 6 has an asymmetrical shape in the upward and downward direction such as a trapezoid shape, and as shown in FIG. 33B, a shape of a base member 60C is generally similar to that of the display 53. In this configuration, the user can recognize at a glance the proper usage posture of the base member 60C corresponding to the display 53. In this case, an outer shape of the base member 60C itself functions as the posture identifier portion for having the user recognize the proper usage posture of the base member 60C.

Where the posture identifier portion for notifying the user of the usage posture of the base member 60 as thus described, the user can speedily recognize, upon operating the base member 60, which posture is proper for changing the image on the display 53 by bending the base member 60.

Tenth Modification

Figure 34:
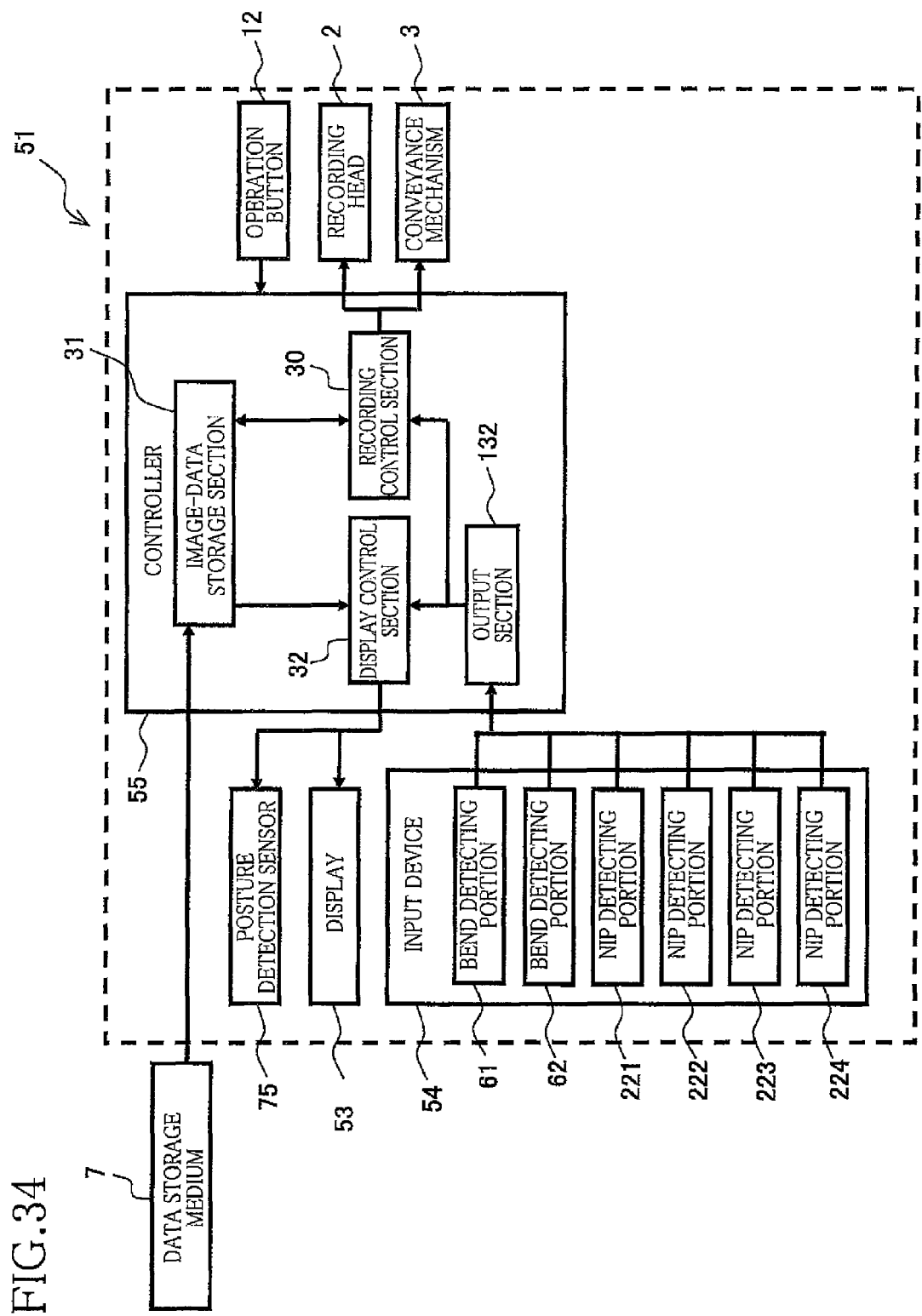
FIG. 34 is a view schematically showing an electric configuration of a printer including a posture detection sensor.

The printer 51 may be configured so as to detect the posture of the base member 60. For example, as shown in FIG. 34, the printer 51 may include a posture detection sensor 75 provided by, e.g., a magnetic sensor so as to detect the posture of the base member 60 that is operated at a position distant from the printer main body 6. In this configuration, a controller 55 of the printer 51 can judge whether the base member 60 is in the proper usage posture or not on the basis of a result of the detection of the posture detection sensor 75. Thus, where the base member 60 is not in the proper usage posture, the printer 51 can notify the user that the base member 60 is not in the proper usage posture by displaying an error message on the display 53, for example.

The printer 51 may be configured to ask the user to bend the base member 60 on a trial basis and to detect the posture of the base member 60 on the basis of a result of the trial bending. In this case, the display 53 first displays a message for asking the user to bend the base member 60 once on the trial basis, before the user operates the input device 54 (e.g., just before the user has removed the input device 54 from a holder, not shown, on which the input device 54 is set when the input device 54 is not used). The necessity of this trial bending operation may not notify the user just before the user operates the input device 54 and may notify the user in advance by description of an instruction manual of the printer 51 or notes attached to the printer main body 6 or the input device 54, for example.

Then, when the user has bent the base member 60 on the trial basis, the controller 55 detects the posture of the base member 60 on the basis of the bending deformation of the base member 60 which has been detected by the bend detecting portions 61, 62. For example, the bend detecting portions 61, 62 are provided on a right end portion of the base member 60 being in the proper usage posture, and the controller asks the user to bend the right end portion of the base member 60 on the trial basis in a current posture. Where the controller 55 has recognized that the right end portion of the base member 60 has been bent on the basis of a result of the detection of the bend detecting portions 61, 62, the controller 55 judges that the current posture is the proper usage posture. On the other hand, where the controller has recognized that a left end portion of the base member 60 has been bent on the basis of a result of the detection of the bend detecting portions 61, 62 although the controller 55 had asked the user to bend the right end portion of the base member 60 on the trial basis, the controller 55 judges that the current posture is a posture laterally inverted from the proper usage posture.

As thus described, where the controller 55 can recognize the posture of the base member 60 on the basis of the result of the detection of the bending deformation upon the trial bending of the user, there is no need to provide a sensor (e.g., the posture detection sensor 75 in FIG. 34) for detecting the posture of the base member 60.

Eleventh Modification

In the above-described embodiment, the input device integral with the display is used in the state in which the input device is connected to the printer including the recording head. However, a device including the display and the input device integral with each other may be used independently as the image display apparatus.

Figure 35:
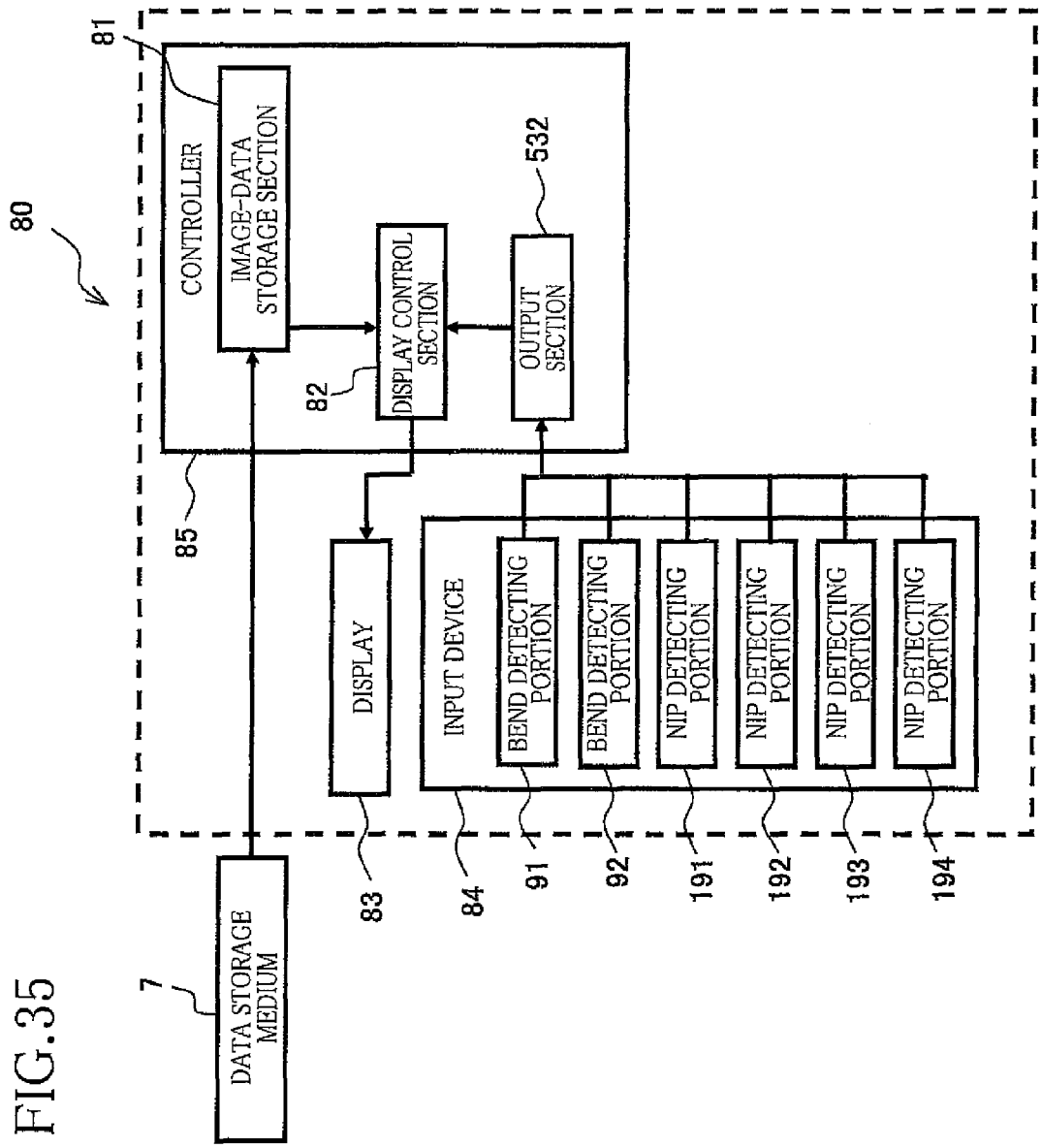
FIG. 35 is a view schematically showing an electric configuration of an image display apparatus in an eleventh modification.

As shown in FIG. 35, an image display apparatus 80 includes: a flexible base member; two bend detecting portions 91, 92 for detecting bending deformation of the base member; an input device 84 having four nip detecting portions 191, 192, 193, 194; a flexible display 83 deformable with the base member by bending of the user; an output section 532 connected to the input device 84; and a control device 85 configured to control the display 83 and the recording control section 30 on the basis of a result of detection of the bend detecting portions 91, 92 and a result of detection of the nip detecting portions 191, 192, 193, 194.

The input device 84 is configured to use the bend detecting portions 91, 92 to detect the bending deformation of the base member when the user has bent the base member. A display control section 82 of the control device 85 for controlling the display 83 changes an image displayed on the display 83 on the basis of the bending deformation of the base member which has been detected by the bend detecting portions 91, 92. Further, the nip detecting portions 191, 192, 193, 194 detect the nip of the base member. On the basis of the result of this detection of the nip detecting portions 191, 192, 193, 194, the control device 85 controls the recording control section 30 to record an image on the recording sheet P and controls the display control section 82 to change the image displayed on the display 83.

It is noted that the image display apparatus 80 includes the control device 85 constituted by components such as a CPU, a ROM, and a RAM. Thus, image data inputted from a data storage medium can be stored in an image-data storage section 81 in the control device 85. When the user has bent the base member, the image data can be extracted and obtained from the image-data storage section 81 depending upon the type of the bending deformation of the base member, and an image based on the image data can be displayed on the display 83. That is, the image display apparatus 80 can independently display the image on the display 83 without connected to a device such as the printer. It should be noted that the image display apparatus 80 can be used in the state in which the image display apparatus 80 is connected to the device such as the printer as in the above-described embodiment.

Twelfth Modification

The input device may be configured such that the display 53 is provided on the input device so as to allow the user to touch a face of the display 53, or move his or her finger on the face while contacting the finger on the face to perform the image processings such as the change of the image and the enlargement/reduction of the image.

In this configuration, the first electrode and the second electrode are provided on the face of the piezoelectric layer 23a (see FIG. 6), and the third electrode and the fourth electrode are provided on the face of the piezoelectric layer 23b (see FIG. 6). When a change of the electric potential has been detected only on the first electrode of the piezoelectric layer 23a, the controller recognizes that the user has touched the face of the display 53 (see FIG. 2) or moved his or her finger on the face of the display 53 (see FIG. 2). When changes of the electric potentials have been detected on both of the first electrode on the piezoelectric layer 23a (see FIG. 6) and the third electrode on the piezoelectric layer 23b (see FIG. 6), the controller recognizes whether the base member 20 (see FIG. 6) has been bent or nipped by the user on the basis of the electric potentials of the first electrode and the third electrode.

In this configuration, the user can touch the display with his or her finger, bend the base member, and nip the base member to operate the input device. Thus, intuitive operations can be assigned to a multiplicity of functions. Thus, it is easy for the user to remember and perform the operations of the input device.

Thirteenth Modification

In the above-described embodiment, the four nip detecting portions are provided on the base member 20, but the number of the nip detecting portions is not limited to four. For example, two or six nip detecting portions may be provided. Where the two nip detecting portions are provided, the first electrode, the second electrode, the third electrode, and the fourth electrode are provided only on the upper right corner portion and the upper left corner portion of the base member 20, for example. Where the six nip detecting portions are provided, the first electrode, the second electrode, the third electrode, and the fourth electrode are provided on the four corners of the base member 20 and a pair of portions thereof near the shorter sides, for example.

Fourteenth Modification

The recording control section may have a function for performing the image recording on one or both of faces of the recording sheet P and may be configured to record an image on one of the faces of the recording sheet P upon the detection of the bending of the bend detecting portion and record images respectively on both of the faces of the recording sheet P upon the detection of the nip of the bend detecting portion. Each of the bend detecting portion and the nip detecting portion includes the first electrode, the second electrode, the third electrode, and the fourth electrode at the upper right corner portion of the base member. When the user has nipped the upper right corner portion of the base member, the nip detection signal is outputted to the recording control section. When having received this nip detection signal, the recording control section performs the image recording on both of the faces of the recording sheet P.

In this configuration, the operation for performing the image recording on one of the faces of the recording sheet P and the operation for performing the image recording on both of the faces of the recording sheet P are different from each other. Further, the nipping operation of the base member by the user suggests the both faces of the recording sheet P. Thus, it is easy for the user to remember the operations.

Fifteenth Modification

The recording control section may have: a staple recording function for recording an image on the recording sheets P and stapling the recording sheets P; and a normal recording function only for performing the recording on the recording sheet(s) P. Each of the bend detecting portion and the nip detecting portion includes the first electrode, the second electrode, the third electrode, and the fourth electrode at the upper right corner portion of the base member. When the user has nipped the upper right corner portion of the base member, the nip detection signal is outputted to the recording control section. When having received this nip detection signal, the recording control section uses the staple recording function to record an image on the recording sheets P and staple the recording sheets P.

In this case, where the bend detecting portion has detected the bending deformation, the recording control section uses the normal recording function to perform the recording without stapling the recording sheets P. Where the nip detecting portion has detected the nip, the recording control section uses the staple recording function to record an image on the recording sheets P and staple the recording sheets P. In this configuration, the operation for performing the recording without stapling the recording sheets P and the operation for performing the recording and stapling the recording sheets P are different from each other. Further, the nipping operation of the base member by the user suggests the staple of the recording sheets P. Thus, it is easy for the user to remember the operations.

Sixteenth Modification

In the above-described embodiment, the input device and the printer are connected with the cable, but the present invention is applicable to a configuration in which the input device and the printer can wirelessly communicate with each other.

Seventeenth Modification

In this modification, the nip detecting portions 221 and 222 are arranged on the base member 20 at the respective positions different from each other as shown in FIG. 3 (portions of the base member 20 on which the nip detecting portions 221, 222 are respectively arranged are examples of a first contact portion and a second contact portion). When the user has nipped the nip detecting portion 221, and the nip detecting portion 221 has detected the nip of the base member 20, the recording head 2 records an image. When the user has nipped the nip detecting portion 222, and the nip detecting portion 222 has detected the nip of the base member 20, the image recording of the image recording portion is canceled. In this configuration, the operation for starting the image recording and the operation for canceling the image recording are different from each other. Thus, it is easy for the user to remember and perform the operations.

Eighteenth Modification

As eighteenth modification, a plurality of image data may be contained in folders in a hierarchical structure, and the controller may control the display to display an image contained in one of the folders depending upon the user's operation of the base member. For example, when the user has nipped the upper right portion of the base member, and the nip detecting portion 221 has detected the nip, the controller controls the display to display an image contained in a folder whose level is different from that of a folder containing an image being displayed (or the controller controls the display to display an image contained in a folder different from a folder containing the image being displayed). When the user has nipped the lower right portion of the base member, and the nip detecting portion 222 has detected the nip, the controller controls the display to display an image contained in a folder whose level is the same as that of the folder containing the image being displayed (or the controller controls the display to display an image (different from the image being displayed) contained in the folder containing the image being displayed).

In the above-described embodiment and its modifications, the present invention is applied to the printer but may be applied to devices other than the printer. For example, the present invention may be applied to a device for operating an electronic device such as a remote controller for a television. Further, the present invention is applicable other various electronic devices.

What is claimed is:

1. An input device, comprising:
   an operation device including:
      a flexible base member;
      a first detector configured to detect that the base member is being bent;
      and a second detector configured to detect that the base member is being nipped; and
   an output section connected to the first detector and the second detector, the output section being configured to output a first signal when the first detector has detected that the base member is being bent and configured to output a second signal when the second detector has detected that the base member is being nipped,
   wherein the second detector is disposed on a contact portion of the base member,
   wherein the second detector is configured to detect that the base member is being nipped, when a user has nipped the contact portion of the base member, and thereby the base member has been elongated in a direction parallel to a face of the base member,
   wherein the contact portion is disposed on a peripheral portion of the base member,
   wherein the first detector has a deformation portion that is deformed when the base member is bent by the user,
   wherein the contact portion and the deformation portion are disposed at the same position on the base member,
   wherein each of the first detector and the second detector includes:
      a first piezoelectric layer provided on a front face of the base member;
      a second piezoelectric layer provided on a back face of the base member;
      a first electrode disposed on the first piezoelectric layer and connected to the output section, wherein an electric potential of the first electrode is changed when the first piezoelectric layer has been deformed;
      a second electrode disposed on the first piezoelectric layer and having a constant electric potential;
      a third electrode disposed on the second piezoelectric layer and connected to the output section, wherein an electric potential of the third electrode is changed when the second piezoelectric layer has been deformed; and
      a fourth electrode disposed on the second piezoelectric layer and having the constant electric potential,
   wherein the contact portion and the deformation portion are disposed in an area in which the first electrode, the second electrode, the third electrode, and the fourth electrode are disposed,
   wherein the first detector detects that the base member is being bent, where the electric potential of the first electrode is higher than that of the second electrode, and the electric potential of the third electrode is lower than that of the fourth electrode, or where the electric potential of the first electrode is lower than that of the second electrode, and the electric potential of the third electrode is higher than that of the fourth electrode, and
   wherein the second detector detects that the base member is being nipped, where the electric potential of the first electrode is higher than that of the second electrode, and the electric potential of the third electrode is higher than that of the fourth electrode, or where the electric potential of the first electrode is lower than that of the second electrode, and the electric potential of the third electrode is lower than the fourth electrode.

2. The input device according to claim 1,
   wherein the base member has a rectangular shape,
   wherein the second detector is disposed on a contact portion of the base member,
   wherein the second detector is configured to detect that the base member is being nipped, when a user has nipped the contact portion of the base member, and thereby the base member has been elongated in a direction parallel to a face of the base member, and
   wherein the contact portion is disposed on at least one of four corners of the base member.

3. The input device according to claim 1,
   wherein the base member has a rectangular shape, and
   wherein the contact portion and the deformation portion are disposed on at least one of four corners of the base member.

4. The input device according to claim 3, wherein each of the first electrode, the second electrode, the third electrode, and the fourth electrode extends in an intersecting direction that is a direction intersecting both of two sides of the base member which are perpendicular to each other.

5. The input device according to claim 4,
   wherein the operation device further includes another first detector having the same configuration of that of the first detector, said another first detector having a deformation portion at a position different from the four corners of the base member, and
   wherein the first electrode, the second electrode, the third electrode, and the fourth electrode are disposed at least one of the four corners.

6. An image display apparatus, comprising:
   a display portion configured to display an image thereon;
   an operation device including:
      a flexible base member;
      a first detector configured to detect that the base member is being bent; and
      a second detector configured to detect that the base member is being nipped;
   an output section connected to the first detector and the second detector, the output section being configured to output a first signal when the first detector has detected that the base member is being bent and configured to output a second signal when the second detector has detected that the base member is being nipped; and a controller connected to the output section and the display portion and configured to control the display of the image on the display portion, on the basis of the first signal and the second signal outputted by the output section, wherein the second detector is disposed on a contact portion of the base member, wherein the second detector is configured to detect that the base member is being nipped, when a user has nipped the contact portion of the base member, and thereby the base member has been elongated in a direction parallel to a face of the base member, wherein the contact portion is disposed on a peripheral portion of the base member, wherein the first detector has a deformation portion that is deformed when the base member is bent by the user, wherein the contact portion and the deformation portion are disposed at the same position on the base member, wherein each of the first detector and the second detector includes:
- a first piezoelectric layer provided on a front face of the base member;
- a second piezoelectric layer provided on a back face of the base member;
- a first electrode disposed on the first piezoelectric layer and connected to the output section, wherein an electric potential of the first electrode is changed when the first piezoelectric layer has been deformed;
- a second electrode disposed on the first piezoelectric layer and having a constant electric potential;
- a third electrode disposed on the second piezoelectric layer and connected to the output section, wherein an electric potential of the third electrode is changed when the second piezoelectric layer has been deformed; and
- a fourth electrode disposed on the second piezoelectric layer and having the constant electric potential, wherein the contact portion and the deformation portion are disposed in an area in which the first electrode, the second electrode, the third electrode, and the fourth electrode are disposed, wherein the first detector detects that the base member is being bent, where the electric potential of the first electrode is higher than that of the second electrode, and the electric potential of the third electrode is lower than that of the fourth electrode, or where the electric potential of the first electrode is lower than that of the second electrode, and the electric potential of the third electrode is higher than that of the fourth electrode, and wherein the second detector detects that the base member is being nipped, where the electric potential of the first electrode is higher than that of the second electrode, and the electric potential of the third electrode is higher than that of the fourth electrode, or where the electric potential of the first electrode is lower than that of the second electrode, and the electric potential of the third electrode is lower than the fourth electrode.

7. The image display apparatus according to claim 6, wherein the base member has a rectangular shape, wherein the second detector is disposed on a contact portion of the base member, wherein the second detector is configured to detect that the base member is being nipped, when a user has nipped the contact portion of the base member, and thereby the base member has been elongated in a direction parallel to a face of the base member, and wherein the contact portion is disposed on at least one of four corners of the base member.

8. The image display apparatus according to claim 6, wherein the base member has a rectangular shape, and wherein the contact portion and the deformation portion are disposed on at least one of four corners of the base member.

9. The image display apparatus according to claim 8, wherein each of the first electrode, the second electrode, the third electrode, and the fourth electrode extends in an intersecting direction that is a direction intersecting both of two sides of the base member which are perpendicular to each other.

10. The image display apparatus according to claim 9, wherein the operation device further includes another first detector having the same configuration of that of the first detector, said another first detector having a deformation portion at a position different from the four corners of the base member, and wherein the first electrode, the second electrode, the third electrode, and the fourth electrode are disposed at least one of the four corners.

11. The image display apparatus according to claim 6, wherein the contact portion includes a first contact portion and a second contact portion located at positions different from each other on the base member, wherein the controller is configured to control the display portion to display a plurality of images such that each of the plurality of images is displayed on a corresponding one of a plurality of levels of a hierarchy, wherein, when the user has nipped a portion of the base member on which the first contact portion is disposed, and the second detector has detected that the base member is being nipped, the controller controls the display portion to display an image whose level is different from that of an image being displayed, and wherein, when the user has nipped a portion of the base member on which the second contact portion is disposed, and the second detector has detected that the base member is being nipped, the controller controls the display portion to display an image whose level is the same as that of the image being displayed.

12. The image display apparatus according to claim 11, wherein the base member has a rectangular shape, wherein the first contact portion is disposed near one of a pair of first opposite sides of the base member, and wherein the second contact portion is disposed near one of a pair of second opposite sides of the base member which are different from the pair of first sides.

13. The image display apparatus according to claim 6, further comprising an image recording portion configured to record an image on a recording medium, wherein the controller includes a recording control section configured to control the image recording portion to record, on the recording medium, the image displayed on the display portion.

14. The image display apparatus according to claim 13, wherein the recording control section is configured to control the image recording portion to perform the recording when the second detector has detected that the base member is being nipped.

15. The image display apparatus according to claim 14, wherein the contact portion includes a first the contact portion and a second contact portion located at positions different from each other on the base member, wherein, when the user has nipped a portion of the base member on which the first contact portion is disposed, and the second detector has detected that the base member is being nipped, the recording control section controls the image recording portion to perform the recording, and wherein, when the user has nipped a portion of the base member on which the second contact portion is disposed, and the second detector has detected that the base member is being nipped, the recording control section cancels the recording being performed by the image recording portion.

16. The image display apparatus according to claim 14,
wherein the image recording portion is configured to record an image or images on one or both of faces of the recording medium, wherein the recording control section is configured to control the image recording portion to perform the recording on the basis of a result of the detection of the first detector and the second detector, wherein, when the user has bent the base member, and the first detector has detected that the base member is being bent, the recording control section controls the image recording portion to perform the recording on one of the faces of the recording medium, and wherein, when the second detector has detected that the base member is being nipped, the recording control section controls the image recording portion to perform the recording on both of the faces of the recording medium.

17. The image display apparatus according to claim 14,
wherein the image recording portion has (i) a staple function for recording the image on a plurality of recording media and stapling the plurality of recording media and (ii) a recording function for recording the image on at least one recording medium without stapling, wherein the recording control section is configured to control the image recording portion to perform the recording on the basis of a result of the detection of the first detector and the second detector, wherein, when the user has bent the base member, and the first detector has detected that the base member is being bent, the recording control section controls the image recording portion to perform the recording using the recording function, and wherein, when the second detector has detected that the base member is being nipped, the recording control section controls the image recording portion to perform the recording using the staple function.

18. The image display apparatus according to claim 6, wherein the first detector is formed of a conductive material and disposed on the face of the base member, the first detector having an electrical resistor whose electrical resistance changes depending upon the deformation of the base member.

* * * * *